US009253080B2

(12) United States Patent
Kaya et al.

(10) Patent No.: US 9,253,080 B2
(45) Date of Patent: Feb. 2, 2016

(54) RELAY DEVICE, NETWORK SYSTEM AND COMPUTER PROGRAM PRODUCT

(75) Inventors: Yoshihiro Kaya, Hadano (JP); Tatsuya Watanuki, Ebina (JP); Hidehiro Fukushima, Inagi (JP)

(73) Assignee: Alaxala Networks Corporation, Kawasaki (JP)

( * ) Notice: Subject to any disclaimer, the term of this patent is extended or adjusted under 35 U.S.C. 154(b) by 919 days.

(21) Appl. No.: 13/463,124

(22) Filed: May 3, 2012

(65) Prior Publication Data

US 2012/0287937 A1    Nov. 15, 2012

(30) Foreign Application Priority Data

May 10, 2011   (JP) .................................. 2011-104811

(51) Int. Cl.
| | |
|---|---|
| H04L 12/28 | (2006.01) |
| H04L 12/56 | (2006.01) |
| H04L 12/707 | (2013.01) |
| H04L 12/703 | (2013.01) |
| H04L 12/24 | (2006.01) |

(52) U.S. Cl.
CPC ............... H04L 45/22 (2013.01); H04L 45/28 (2013.01); *H04L 12/2422* (2013.01); *H04L 41/0654* (2013.01)

(58) Field of Classification Search
CPC ............ H04L 12/2422; H04L 12/2474; H04L 2012/5627; H04L 41/0654; H04L 41/0659; H04L 45/28; H04L 45/22
See application file for complete search history.

(56) References Cited

U.S. PATENT DOCUMENTS

| | | | |
|---|---|---|---|
| 8,631,115 B2* | 1/2014 | Sheinfeld et al. ............. | 709/224 |
| 2010/0306574 A1* | 12/2010 | Suzuki et al. ..................... | 714/4 |
| 2011/0058488 A1* | 3/2011 | Watari et al. .................. | 370/245 |

FOREIGN PATENT DOCUMENTS

| | | |
|---|---|---|
| JP | 01-162452 | 6/1989 |
| JP | 2010-130161 | 6/2010 |
| JP | 2010-245702 A | 10/2010 |

OTHER PUBLICATIONS

Japan Patent Office, Notification of Reasons for Rejection on application 2011-104811 mailed Jun. 18, 2013; pp. 1-2.

* cited by examiner

*Primary Examiner* — Lonnie Sweet
(74) *Attorney, Agent, or Firm* — Foley & Lardner LLP

(57) ABSTRACT

A relay device comprises: a routing controller configured to perform learning of routing information, which includes area information used to identify a relay area of communication packets and a network address of one or more other relay devices, and to determine a relay route of the communication packets, based on the learnt routing information; and a relay module configured to send the communication packets received by the relay device to a destination address of the received communication packets, based on the determined relay route. When the relay device receives a disaster notification packet notifying of a disaster area and when the determined relay route includes the disaster area, the routing controller changes the relay route to an alternative relay route that does not include the disaster area.

9 Claims, 23 Drawing Sheets

Fig.6

| AREA ID | AREA NAME |
|---|---|
| 1 | Osaka Prefecture, Northern Region |
| 2 | Aichi Prefecture, Western Region |
| 3 | Shizuoka Prefecture, Eastern Region |
| 4 | Nagano Prefecture, Northern Region |
| 5 | Nagano Prefecture, Southern Region |
| 6 | Tokyo 23 Wards |
| ⋮ | ⋮ |

Fig.7

| DISASTER NOTIFICATION DESTINATION IP ADDRESS | AREA ID |
|---|---|
| A1 | 1 |
| A2 | 1 |
| B1 | 2 |
| B2 | 2 |
| C1 | 3 |
| C2 | 3 |
| D1 | 4 |
| ⋮ | ⋮ |

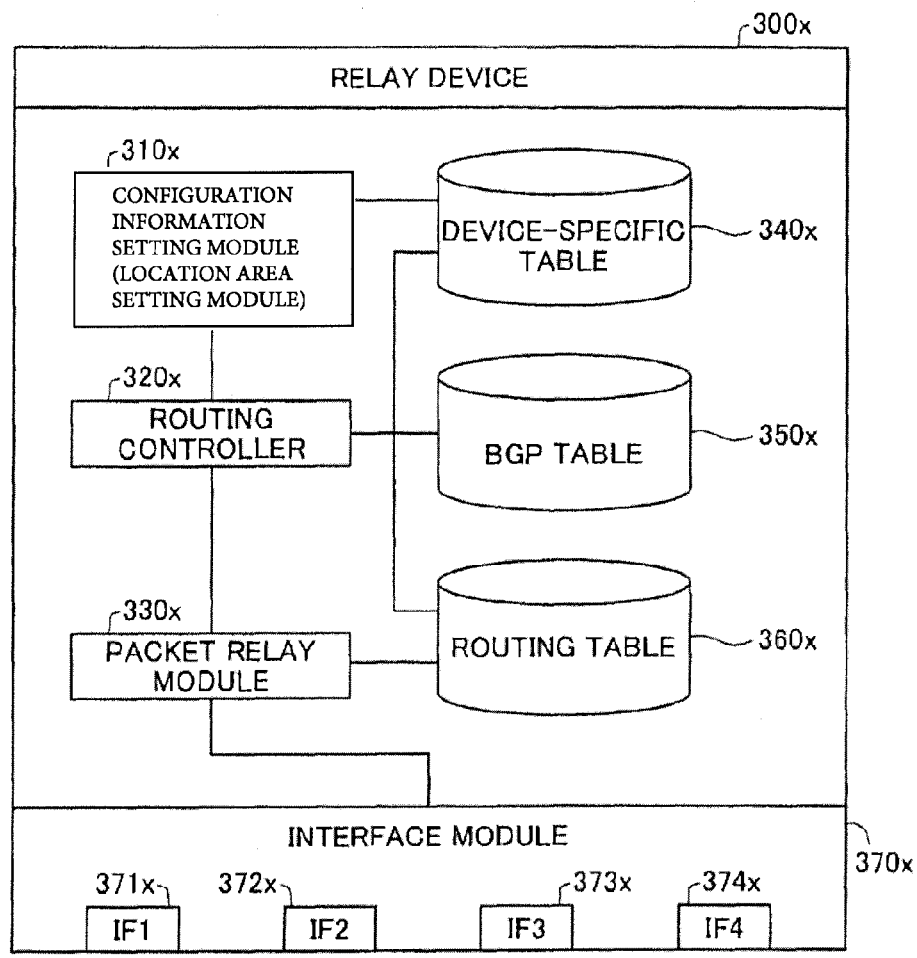

Fig.10

BEFORE OCCURRENCE OF DISASTER

350a

| OPTIMAL ROUTE | PRIORITY | DESTINATION NETWORK ADDRESS | LIST OF AS NUMBERS + AREA IDS | NEXT HOP | INTERFACE |
|---|---|---|---|---|---|
| O | 1 | G | AS2+AREA ID 2, AS3+AREA ID 3, AS6+AREA ID 6 | B1 | IF1 |
|  | 2 | G | AS4+AREA ID 4, AS4+AREA ID 5, AS5+AREA ID 5, AS6+AREA ID 6 | D1 | IF2 |
| O | 1 | F | AS4+AREA ID 4, AS4+AREA ID 5, AS5+AREA ID 5 | D1 | IF2 |
|  | 2 | F | AS2+AREA ID 2, AS3+AREA ID 3, AS6+AREA ID 6, AS5+AREA ID 5 | B1 | IF1 |
| ... | ... | ... | ... | ... | ... |

Fig.11

BEFORE OCCURRENCE OF DISASTER

360a

| DESTINATION NETWORK ADDRESS | NEXT HOP | INTERFACE |
|---|---|---|
| G | B1 | IF1 |
| F | D1 | IF2 |
| ⋮ | ⋮ | ⋮ |

Fig.12

AREA ID PACKET

| IP HEADER | PAYLOAD | |
|---|---|---|
| | AREA ID NOTIFICATION TYPE | AREA ID |

Fig.18

ROUTING INFORMATION PACKET

| BGP MESSAGE HEADER | UPDATE MESSAGE DATA | |  |
|---|---|---|---|
| | PASS SEGMENT TYPE | PASS SEGMENT LENGTH | PASS SEGMENT SETTING |

Fig.23

AFTER OCCURRENCE OF DISASTER

350a

| OPTIMAL ROUTE | PRIORITY | DESTINATION NETWORK ADDRESS | LIST OF AS NUMBERS + AREA IDS | NEXT HOP | INTERFACE |
|---|---|---|---|---|---|
| | 1 | G | AS2+AREA ID 2, AS3+AREA ID 3, AS6+AREA ID 6 | B1 | IF1 |
| ○ | 2 | G | AS4+AREA ID 4, AS4+AREA ID 5, AS5+AREA ID 5, AS6+AREA ID 6 | D1 | IF2 |
| ○ | 1 | F | AS4+AREA ID 4, AS4+AREA ID 5, AS5+AREA ID 5 | D1 | IF2 |
| | 2 | F | AS2+AREA ID 2, AS3+AREA ID 3, AS6+AREA ID 6, AS5+AREA ID 5 | B1 | IF1 |
| ... | ... | ... | ... | ... | ... |

Fig.24

AFTER OCCURRENCE OF DISASTER

360a

| DESTINATION NETWORK ADDRESS | NEXT HOP | INTERFACE |
|---|---|---|
| G | D1 | IF2 |
| F | D1 | IF2 |
| ⋮ | ⋮ | ⋮ |

| DISASTER NOTIFICATION DESTINATION IP ADDRESS | AREA ID |
|---|---|
| A3 | 1 |
| B3 | 2 |
| C3 | 3 |
| D3 | 4 |
| E3 | 5 |
| F3 | 5 |
| G3 | 6 |

| DISASTER NOTIFICATION DESTINATION IP ADDRESS | AREA ID |
|---|---|
| A1 | 1 |
| A2 | 1 | ial
RELAY DEVICE, NETWORK SYSTEM AND COMPUTER PROGRAM PRODUCT

CROSS-REFERENCE TO RELATED APPLICATION

This application claims priority under 35 U.S.C. §119 to Japanese Patent Application No. 2011-104811 filed on May 10, 2011, which is hereby incorporated by reference in its entirety and for all purposes.

BACKGROUND

1. Technical Field

The present invention relates to routing control by a relay device configured to relay communication packets.

2. Description of the Related Art

JP2010-130161A disclosed solution To provide a traffic detour control system which can detour the traffic of each communication area properly according to the scale of an event, e.g. an earthquake or a typhoon, and increases the traffic volume of each communication area.

SUMMARY

On the occurrence of a large-scale disaster, for example, a natural disaster like an earthquake or a typhoon or a manmade disaster like a large-scale armed attack or a terrorism, a packet relay device (hereinafter referred to as "relay device"), such as a router or a switch, may be damaged to cause termination of the connection. In routing control by a routing protocol, for example, BGP (Border Gateway Protocol), in an IP network, when connection is terminated between a relay device in a disaster area and a relay device in a non-disaster area by the routing protocol, the relay route is recalculated and changed. The process of changing the relay route is described with reference to FIG. 1.

In the network system of FIG. 1, relay devices 11a and 12a are interconnected with a network N1a in an area A1. Similarly, relay devices 21a and 22a are interconnected with a network N2a in an area A2, relay devices 31a and 32a are inter connected with a network N3a in an area A3, and relay devices 41a and 42a are interconnected with a network N4a in an area A4. The network in the area A1 is connected with the network in the area A3 by a link R1a. The network in the area A3 is connected with the network in the area A2 by a link R2a. The network in the area A1 is also connected with the network in the area A4 by a link R3a. The network in the area A4 is connected with the network in the area A2 by a link R4a.

In the normal state, a communication path P1a going through the network in the area A3 is established from the relay device 11a in the area A1 to the relay device 22a in the area A2. A communication path P2a going through the network in the area A4 is established as an alternative route by the routing protocol.

In this state, when a large-scale disaster occurs in the area A3 as shown in FIG. 1, failures of the relay devices and the link failures in the area A3 cause multiple network failures. This may terminate the connection by the routing protocol between the relay devices on the communication path P1a. On the occasion of termination of the connection by the routing protocol, the relay device 11a in the area A1 changes the failed communication path P1a to the normally linked communication path P2a as the alternative route to rebuild the relay route.

This method, however, is desired to be improved in terms of the route convergence time and the communication quality degradation. The problem of the route convergence time occurs as follows. When a specific relay device is damaged, an adjacent relay device deletes the existing relay route going through the damaged relay device, recalculates a new relay route and notifies a further adjacent relay device of routing information of the recalculated relay route, so as to transmit the routing information over the whole network. When a large number of relay devices are damaged in a disaster area, this series of operations is expanded over the whole network. The effect is gradually propagated to relay devices located near the border of the disaster area, and there is a need of multiple recalculations of the routing information. This may abruptly increase the operation loads in the respective relay devices and cause the processing delay of the routing protocol. As a result, the connection is terminated by the routing protocol between the relay device located near the non-disaster side of the disaster area (for example, the relay device 32a in FIG. 1) and the relay device located near the disaster side of the non-disaster area (for example, the relay device 11a in FIG. 1). At this moment, the failed relay route is changed to the alternative route. A relatively long time has accordingly elapsed between the occurrence of the disaster and the change of the relay route, thereby causing a long time of communication blackout. It also takes time to transmit the routing information indicating the inaccessibility to the destination to the relay device located near the disaster side of the non-disaster area (for example, the relay device 11a in FIG. 1), thereby extending the communication blackout time and the route convergence time.

The communication quality degradation is caused as follows. When the connection by the routing protocol is not terminated between the relay devices on the communication path going through the disaster area, the relay route going through the disaster area is not changed but is maintained. On the occurrence of a disaster, however, heavy communication traffic is expected in the disaster area for safety confirmations. This may extend network convergence time in the disaster area and increase the probability of the delay or loss of communication packets (hereinafter may be referred to as "packets") going through the disaster area, which leads to the poor communication quality.

Consequently, in order to solve at least part of the foregoing, there is desired to promptly change the relay route of communication packets on the occurrence of a disaster without waiting for termination of the connection by the routing protocol. There is also desired to reduce degradation of the communication quality due to the occurrence of a disaster in the case where the connection by the routing protocol is not terminated.

In order to achieve at least part of the foregoing, the present invention provides various aspects or embodiments described below.

According to a first aspect, there is provided a relay device configured to relay communication packets. The relay device comprises: a routing controller configured to perform learning of routing information, which includes area information used to identify a relay area of the communication packets and a network address of one or more other relay devices, and to determine a relay route of the communication packets based on the learnt routing information; and a relay module configured to send the communication packets received by the relay device to a destination address of the received communication packets based on the determined relay route. When the relay device receives a disaster notification packet notifying of a disaster area and when the determined relay route includes the disaster area, the routing controller changes the relay route to an alternative relay route that does not include the disaster area.

When receiving the disaster notification packet, the relay device of the first aspect changes the determined relay route to an alternative relay route that does not include the disaster area. This enables the relay route to be promptly changed to an alternative route on the occurrence of a disaster without waiting for termination of the connection by the routing protocol between the relay devices on the communication path going through the disaster area. In the case where the connection by the routing protocol is not terminated, the configuration of this relay device changes the relay route to an alternative route bypassing the disaster area, thus advantageously avoiding network congestion in the disaster area. This effectively reduces the degradation of communication quality between the areas other than the disaster area. The term "disaster area" herein includes both the area where a disaster actually occurs and the area where the occurrence of a disaster is predicted.

According to a second aspect, the relay device may further comprise a storage module configured to store a location area of the relay device. When the relay device receives a routing information packet that is structured to allow the learning of the routing information and includes a location area and a network address of the first relay device from a first relay device of the other relay devices, the routing controller performs the learning of the routing information based on the received routing information packet, and the routing controller adds a location area and a network address of the relay device to the received routing information packet so as to generate a new routing information packet. The relay module sends the new routing information packet to a second relay device of the other relay devices, which is different from the first relay device.

The relay device of the second aspect exchanges routing information packets with one or more other relay device having the configuration of the second aspect and thereby dynamically learns the routing information. This improves the user's convenience.

According to a third aspect, the relay device may further comprise a location area setting module configured to record into the storage module a location area of the relay device, which is included in a reply packet received by the relay device as a response to a request to a server that registers the location area of the relay device.

The relay device of the third aspect enables the location area of the relay device to be automatically recorded. This does not require the user's manual entry of the location area into the relay device. This configuration is especially advantageous when there are a large number of relay devices.

According to a fourth aspect, there is provided the relay device, wherein the area information is structured to indicate a separation between relay areas, and when there are a plurality of candidate alternative routes which do not include the disaster area, the routing controller sets, among the plurality of candidate alternative routes, a relatively lower priority to a relay route including a relay area having a relatively smaller separation from the disaster area, and determines the alternative route, which the determined relay route is to be changed to, according to the priority.

When there are a plurality of relay routes as the candidates of the alternative route, the relay device of the fourth aspect lowers the possibility of changing the current relay route to a relay route including a relay area having the relatively small separation degree from the disaster area. This improves the reliability of the alternative route.

According to a fifth aspect, there is provided the relay device, wherein the routing controller determines the relay route by giving preference to a relay route having a relatively smaller number of hops included in the learnt routing information.

The relay device of the fifth aspect enables efficient relay of the communication packets by the relay route having the less number of hops.

The invention is not limited to the relay device described above but may also be implemented as network systems according to a sixth aspect and a seventh aspect described below. The configurations described in the second to the fifth aspects may be added to these network systems.

According to a sixth aspect, there is provided a network system including a server and a plurality of relay devices, wherein at least one relay device is provided in each area specified by area division and each of the relay devices is configured to relay communication packets. The server comprises: an acquisition module configured to obtain disaster information representing occurrence of a disaster or prediction for occurrence of a disaster in a specific area, from outside; and a disaster notification module configured to send a disaster notification packet including information representing a disaster area which is the specific area, based on the obtained disaster information, and to provide notification of the disaster area to a relay device other than a relay device located in the disaster area among the plurality of relay devices. Each of the plurality of relay devices comprises: a routing controller configured to perform learning of routing information, which includes area information used to identify a relay area of the communication packets specified based on the area division and a network address of one or more other relay devices, and to determine a relay route of the communication packets based on the routing information; and a relay module configured to send the communication packets received by the relay device to a destination address of the received communication packets based on the determined relay route. When the relay device receives the disaster notification packet and when the determined relay route includes the disaster area, the routing controller changes the relay route to an alternative relay route that does not include the disaster area.

According to a seventh aspect, there is provided a network system including a first server, a plurality of second servers wherein at least one second server is provided in each area specified by area division, and a plurality of relay devices, each being configured to relay communication packets. The first server comprises: an acquisition module configured to obtain disaster information representing occurrence of a disaster or prediction for occurrence of a disaster in a specific area, from outside; and a first disaster notification module configured to send a first disaster notification packet including information representing a disaster area which is the specific area, based on the obtained disaster information, and to provide notification of the disaster area to a second server other than a second server located in the disaster area among the plurality of second servers. Each of the plurality of second servers comprises: a receiver configured to receive the first disaster notification packet; and a second disaster notification module configured to send a second disaster notification packet including the information representing the disaster area, which is included in the first disaster notification packet, and to provide notification of the disaster area to a relay device other than a relay device located in the disaster area among the plurality of relay devices. Each of the plurality of relay devices comprises: a routing controller configured to perform learning of routing information, which includes area information used to identify a relay area of the communication packets specified based on the area division and a network address of one or more other relay devices, and to determine a relay route of the communication packets, based on the routing information; and a relay module configured to send the communication packets received by the relay device to a destination address of the received communication packets, based on the determined relay route. When the relay device receives the second disaster notification packet and when the determined relay route includes the disaster area, the routing controller changes the relay route to an alternative relay route that does not include the disaster area.

The invention may also be implemented by, for example, a server provided in the network system according to the sixth aspect or the network system according to the seventh aspect, computer program products according to eighth to eleventh aspects described below, and a routing control method of the relay device.

According to an eighth aspect, there is provided a computer program product giving notification to a plurality of relay devices, each being configured to relay communication packets. The computer program product comprises; a non-transitory computer readable storage medium; and a computer program code stored in the non-transitory computer readable storage. The computer program code comprises: a program code for an acquisition function of obtaining disaster information representing occurrence of a disaster or prediction for occurrence of a disaster in a specific area, from outside; and a program code for a disaster notification function of sending a disaster notification packet including information representing a disaster area, which is the specific area, based on the obtained disaster information and notifying at least a relay device other than a relay device located in the disaster area among the plurality of relay devices, of the disaster area.

The computer program product of the eighth aspect enables the relay device according to any of the first to the fifth aspects to be notified of the disaster area. This computer program product accordingly has the same advantageous effects as those of the relay device according to any of the first to the fifth aspects described above.

According to a ninth aspect, the computer program code may further comprises: a program code for a retrieval function of searching the obtained disaster information with a predetermined keyword to retrieve the disaster area. The disaster notification function sends the disaster notification packet including information representing the retrieved disaster area.

The computer program product of the ninth aspect does not limit the disaster information to data generated in a predetermined format.

According to a tenth aspect, there is provided the computer program product wherein the disaster information includes a disaster scale, and the disaster notification function notifies of the disaster area only when the disaster scale is equal to or greater than a predetermined threshold.

The computer program product of the tenth aspect changes the determined relay route to the alternative relay route only when the disaster occurring or the disaster predicted to occur is expected to have the disaster scale that may affect communication between the relay devices. This prevents unnecessary change of the relay route and reduces transmission of unnecessary disaster notification packets, thus restricting an increase of the network load.

According to an eleventh aspect, the computer program code may further comprises: a program code for a storage function of respectively storing location areas of the plurality of relay devices; and a program code for a location area notification function of notifying each relay device of the location area of the relay device, in response to a request from the relay device.

The computer program product of the eleventh aspect enables the relay device of the third aspect described above to be notified of the location area of the relay device. This computer program product accordingly has the same advantageous effects as those of the relay device of the third aspect described above.

BRIEF DESCRIPTION OF THE DRAWINGS

FIG. 6 shows a concrete example of an area table included in the disaster information management server;

FIG. 7 shows a concrete example of a disaster notification destination table included in the disaster information management server;

FIG. 8 illustrates the general structure of a relay device;

FIG. 9 shows a concrete example of a device-specific table included in the relay device;

FIG. 10 shows a concrete example of a BGP table included in the relay device, in the state before the occurrence of a disaster;

FIG. 11 shows a concrete example of a routing table included in the relay device, in the state before the occurrence of a disaster;

FIG. 12 shows the format of an area ID packet;

FIG. 18 shows the format of a routing information packet;

FIG. 23 shows a concrete example of the BGP table included in the relay device, in the state after the occurrence of a disaster;

FIG. 24 shows a concrete example of the routing table included in the relay device, in the state after the occurrence of a disaster;

DESCRIPTION OF EMBODIMENTS

A. First Embodiment

A-1. System Configuration

Figure 1:
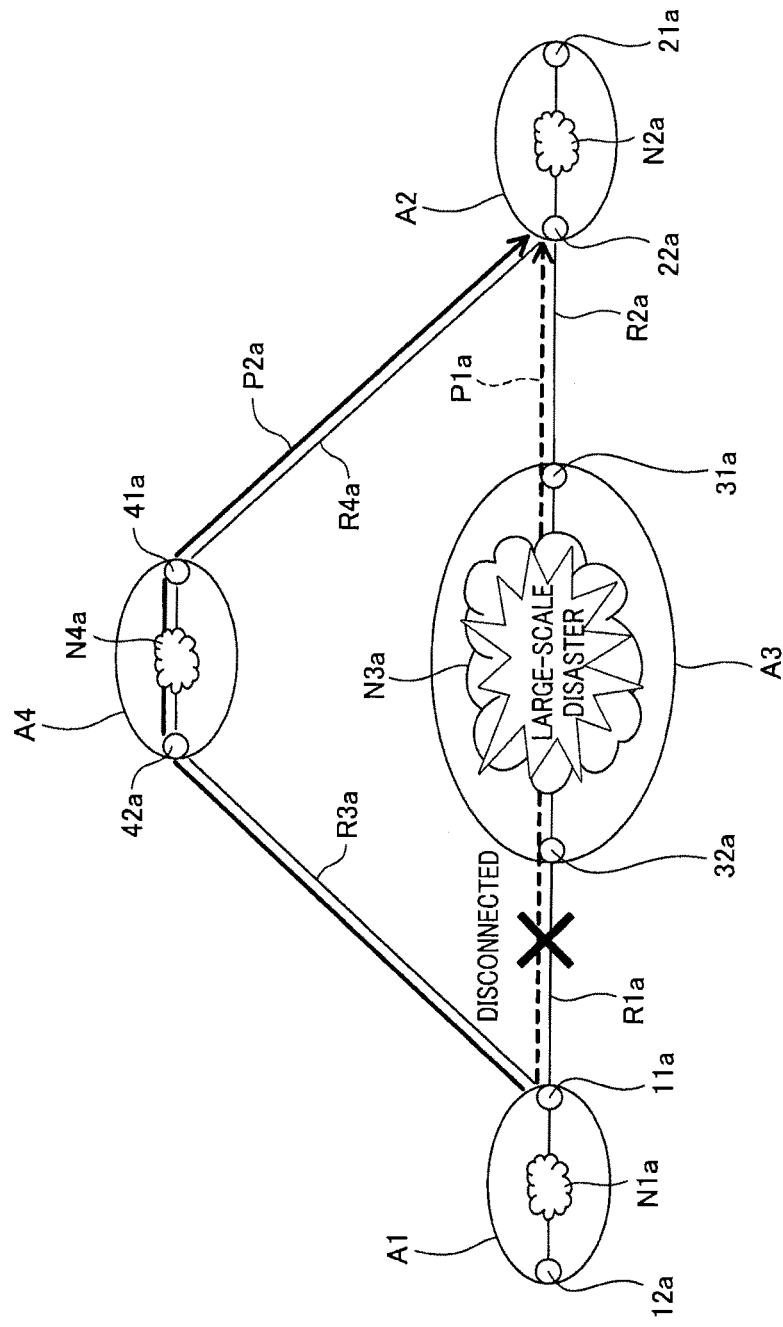
FIG. 1 illustrates prior art routing control in a relay device.
Figure 2:
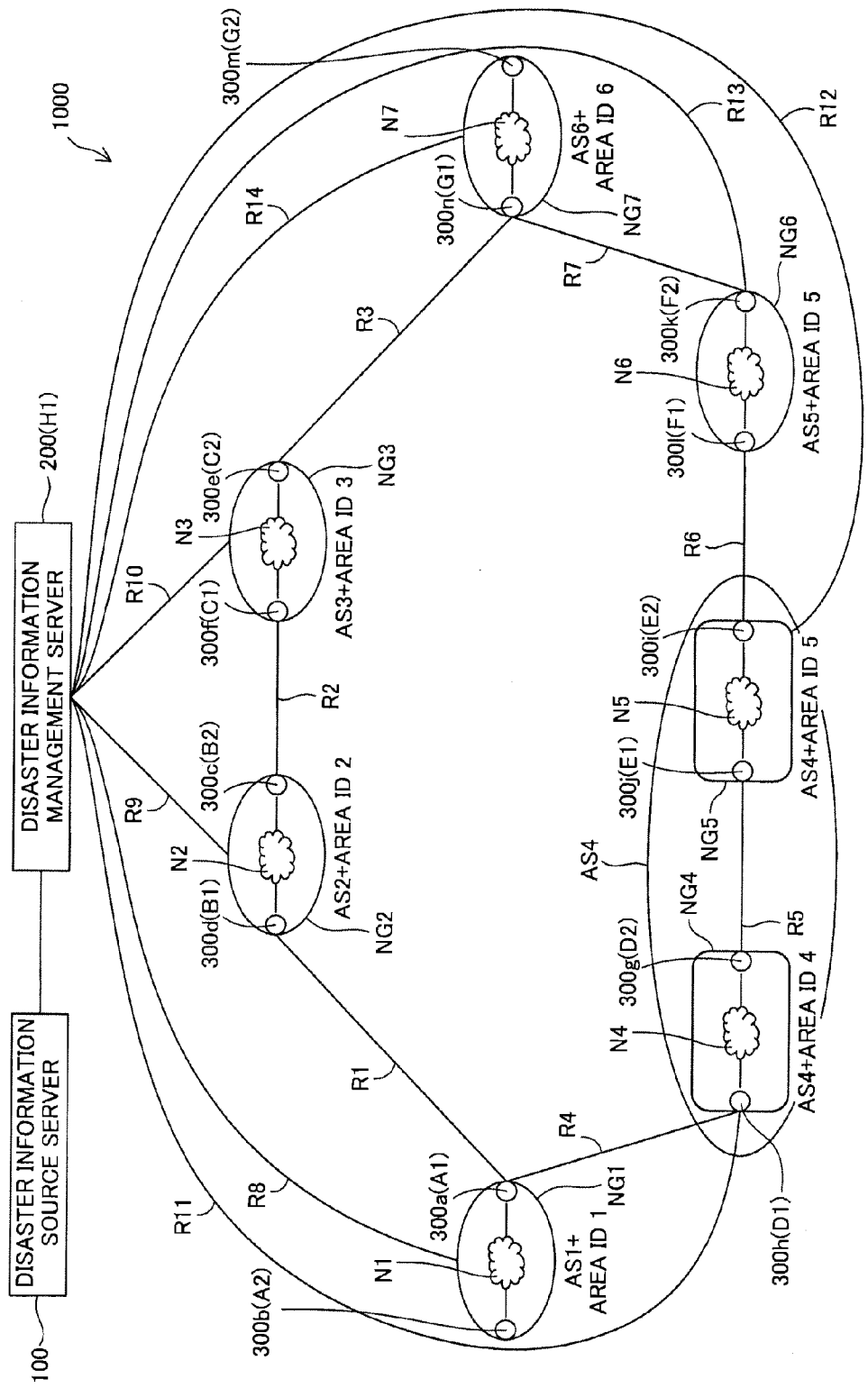
FIG. 2 illustrates the general configuration of a network system according to one embodiment of the invention.

FIG. 2 illustrates the general configuration of a network system 1000 using relay devices 300a to 300n according to one embodiment of the relay device of the invention. The network system 1000 includes a disaster information management server 200 and a plurality of relay devices 300a to 300n (hereinafter collectively referred to as "relay device 300x"). In this network system 1000, the disaster information management server 200 and networks N1 to N7 are interconnected by links R1 to R14. The disaster information management server 200 is configured to distribute geographical information and receive and send disaster information as described in detail later. The relay devices 300a to 300n are configured to relay packets on the network layer or layer 3 in the OSI reference model. The relay devices 300a to 300n may alternatively be configured to relay packets on the layer 2.

Each of the networks N1 to N7 is located at a specific area in one of autonomous systems AS, which are provided as independent network systems each operated under a respective single administrative control. Each of the networks N1 to N7 is assigned with an AS number (AS1 to AS6) for identifying the autonomous system AS, which the network belongs to, and an area ID (ID1 to ID6) for identifying the area where the network is located. The respective networks N1 to N7 are interconnected by a plurality of relay devices and a plurality of links. The combinations of these network N1 to N7 with relay devices directly connected to the respective networks N1 to N7 are also called network groups NG1 to NG7.

The network groups NG1 to NG7 are identifiable by the combination of the AS number and the area ID. For example, the network group NG1 including the network N1 and the relay devices 300a and 300b is discriminated from the other network groups NG2 to NG7 by the combination of "AS1+ Area ID1". Similarly, in another example, the network group NG2 including the network N2 and the relay devices 300c and 300d is discriminated from the other network groups NG1 and NG3 to NG7 by the combination of "AS2+Area ID2".

The relay devices 300a to 300n included in this network system 1000 perform BGP (border gateway protocol)-based routing control. The BGP protocol is known in the art and is not described here in detail. In brief, the BGP protocol is the routing protocol used to allow exchange of routing information between adjacent relay devices and perform routing control across the autonomous systems AS, wherein the autonomous system AS is set as the minimum unit. This embodiment, however, performs routing control across the area IDs, wherein the network with the assigned area ID located in the autonomous system AS is set as the minimum unit.

The disaster information management server 200 is connected with a server 100 to provide Earthquake Early Warning issued by Japan Meteorological Agency (hereinafter referred to as "disaster information source server 100") via a predetermined network (not shown). The Earthquake Early Warning is prediction and warning of ground motion issued just after an earthquake is detected. The Earthquake Early Warning analyzes observation data detected by seismographs located close to the earthquake center, promptly estimates the earthquake center and the earthquake size (magnitude) and predicts and notifies of the arrival time and the earthquake intensity of the main shock at the respective regions, based on the results of estimation. In the description hereinafter, the Earthquake Early Warning is also referred to as disaster information DI.

Figure 3:
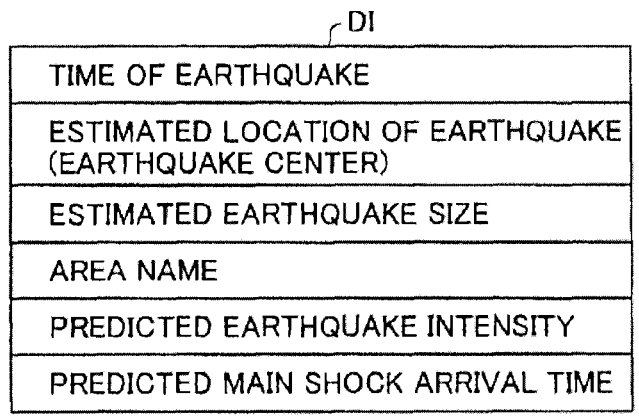
FIG. 3 shows the contents of disaster information DI, which a disaster information management server receives from a disaster information source server.

FIG. 3 shows the contents of the disaster information DI according to this embodiment. As illustrated, the disaster information DI includes the time of earthquake, the estimated location of earthquake (earthquake center), the estimated earthquake size (magnitude), the area name and the predicted earthquake intensity correlated to the area name, and the predicted arrival time of the main shock to the area (predicted main shock arrival time).

In the network system 1000, the disaster information management server 200 notifies the relay device 300x of the occurrence of a disaster, based on the disaster information DI received from the disaster information source server 100. The relay device 300x changes the relay route, based on the received notification. The following describes the details of such routing control.

As illustrated in FIG. 2, network addresses H, A, B, C, D, E F, and G are respectively assigned to the network, which the disaster information management server 200 belongs to, and to the network groups NG1 and NG7. IP addresses H1, A1, B1, C1, D1, E1, F1 and G1 are assigned to the disaster information management server 200 and to the relay devices 300a, 300d, 300f, 300h, 300j, 300l and 300n, respectively.

A-2. Structure of Disaster Information Management Server 200

Figure 4:
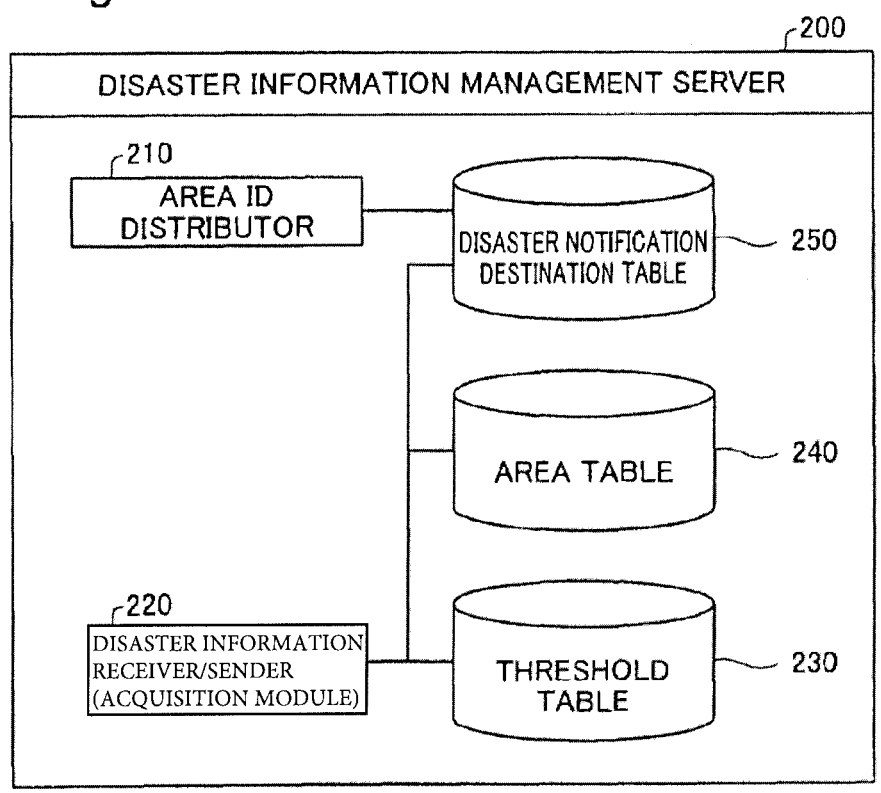
FIG. 4 illustrates the general structure of the disaster information management server.

FIG. 4 illustrates the general structure of the disaster information management server 200. As illustrated, the disaster information management server 200 includes an area ID distributor 210, a disaster information sender/receiver 220, a threshold table 230, an area table 240 and a disaster notification destination table 250. The area ID distributor 210 corresponds to the location area notification function described in the claims. The disaster information receiver/sender 220 corresponds to the acquisition function, the disaster notification function and the retrieval function described in the claims. The disaster notification destination table 250 corresponds to the storage function described in the claims.

The area ID distributer 210 receives a request from each relay device 300x and distributes an area ID to the relay device 300x sending the request. The disaster information receiver/sender 220 receives the disaster information DI from the disaster information source server 100 and notifies each relay device 300x of the area ID of a disaster area. Such notification is hereinafter referred to as disaster notification, and packets used for disaster notification are referred to as disaster notification packets. According to this embodiment, a CPU (not shown) included in the disaster information management server 200 executes a predetermined program to implement the functions of the area ID distributor 210 and the disaster information receiver/server 220. The details of these functions will be described later.

The threshold table 230, the area table 240 and the disaster notification destination table 250 are stored in a specific location of a memory (not shown) included in the disaster information management server 200. The contents of these tables are registered in advance by the user.

Figure 5:
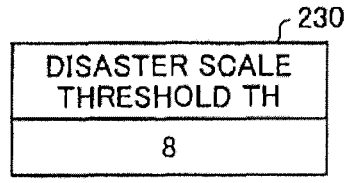
FIG. 5 shows a concrete example of a threshold table included in the disaster information management server.

The threshold table 230 stores a disaster scale threshold TH used as the criterion to determine whether a disaster notification is to be given to each relay device 300x. When receiving the disaster information DI of or above the disaster scale threshold TH, the disaster information receiver/sender 220 sends a disaster notification. A concrete example of the threshold table 230 is shown in FIG. 5. In this illustrated example of the threshold table 230, the value "8" of the earthquake size (magnitude) is recorded as the disaster scale threshold TH.

The area table 240 stores a list of the area IDs in correlation to the geographical area names. An unequivocal number is assigned as the area ID to each area name. A concrete example of the area table 240 is shown in FIG. 6. In this illustrated example of the area table 240, the area ID "1" is correlated to the area name "Osaka Prefecture, Northern Region", and the area ID "2" is correlated to the area name "Aichi Prefecture, Western Region". The user is allowed to arbitrarily set the divisions of these areas.

The disaster notification destination table 250 stores a list of the disaster notification destinations. The disaster notification destinations recorded in the disaster notification destination table 250 are the respective relay devices 300x. According to this embodiment, the IP address of each relay device 300x specified as the disaster notification destination is correlated to the area ID assigned to the relay device 300x. The area ID corresponding to the area where the relay device 300x is located is assigned to the relay device 300x. A concrete example of the disaster notification destination table 250 is shown in FIG. 7. In this illustrated example of disaster notification destination table 250, the disaster notification destination IP address "A1" is correlated to the area ID "1". This disaster notification destination IP address indicates the relay device 300a.

A-3. Structure of Relay Device 300x

The relay devices 300x (i.e., relay devices 300a to 300n) have the same structure. The following describes the detailed structure of the relay device 300x. FIG. 8 illustrates the general structure of the relay device 300x. As illustrated, the relay device 300x includes a configuration information setting module 310x, a routing controller 320x, a packet relay module 330x, a device-specific table 340x, a BGP table 350x, a routing table 360x and an interface module 370x. In the description below, when there is a need to identify a constituent of the relay device 300x as the constituent of a specific one of the relay devices 300a to 300n, the suffix symbol "x" is changed to the corresponding symbol of "a" to "n". For example, the configuration information setting module of the relay device 300a is expressed as the configuration information setting module 310a. The configuration information setting module 310x corresponds to the location area setting module described in the claims. The routing controller 320x corresponds to the routing controller described in the claims. The packet relay module 330x corresponds to the relay module described in the claims. The device-specific table 340x corresponds to the storage module described in the claims.

The configuration information setting module 310x receives the user's setting information on the own relay device 300x and sets the received setting information. The routing controller 320x selects an optimal route. The packet relay module 330x relays a received packet to the selected optimal route. According to this embodiment, a CPU (not shown) included in the relay device 300x executes a predetermined program to implement the respective functions of the configuration information setting module 310x, the routing controller 320x and the packet relay module 330x.

The interface module 370x serves as an interface to send and receive packets to and from physical lines. According to this embodiment, the interface module 370x includes four ports 371x to 374x. The ports 371x to 374x are also referred to as interfaces IF1 to IF4.

The device-specific table 340x, the BGP table 350x and the routing table 360x are stored in a specific location of a memory (not shown) included in the relay device 300x.

The device-specific table 340x is configured to store intrinsic information specific for each relay device 300x. According to this embodiment, the device-specific table 340x has the AS number registered in correlation to the area ID, the disaster notification source and the function ON-OFF state. FIG. 9 illustrates a device-specific table 340a of the relay device 300a as a concrete example of the device-specific table 340x. In this illustrated example, the AS number "1" assigned to the relay device 300a is registered in the AS number field. The area ID "1" assigned to the relay device 300a is registered in the area ID field. The IP address of the server, from which the disaster notification is obtained, i.e., the IP address "H1" of the disaster information management server 200, is registered in the disaster notification source field. The function ON-OFF state is information representing the enabled/disabled (ON/OFF) state of the routing change function set based on the disaster notification received from the disaster information management server 200. In the illustrated example, the ON or enabled state is registered in the function ON-OFF state field.

The AS number, the disaster notification source and the function ON-OFF state are registered in advance by the user. According to this embodiment, the relay device 300a obtains the area ID from the disaster information management server 200 and registers the obtained area ID by a series of processing described later. According to another embodiment, the area ID may alternatively be registered in advance by the user.

The BGP table 350x is referred to by the BGP routing protocol. According to this embodiment, the BGP table 350x has the destination network address and the list of AS numbers and area IDs registered in correlation to the setting of the optimal route, the priority, the next hop and the interface. FIG. 10 illustrates a BGP table 350a of the relay device 300a as a concrete example of the BGP table 350x. The concrete example of the BGP table 350a shown in FIG. 10 has the registry in the non-disaster state, i.e., in the state that the relay device 300a does not receive the disaster notification from the disaster information management server 200.

The optimal route field shows whether the corresponding route is the optimal route for one identical destination network address. The priority field shows the priority order for selecting the corresponding route in the non-disaster state with respect to one identical destination network address. The destination network address shows the address of a destination network of a packet forwarded to by the relay device 300a. The list of AS numbers and area IDs shows a set of the combinations of AS numbers and area IDs, i.e., a selected set of the network groups NG1 to NG7, to be routed through before the forwarded packet reaches the destination network. The next hop shows the IP address of a relay device as the next destination of the packet to be forwarded to the destination network address. The interface shows a port number corresponding to the next hop.

In the illustrated example of FIG. 10, the open circle symbol "o" is set in the optimal route field when the corresponding route of the entry is the optimal route. No symbol is set in the optimal route field when the corresponding route of the entry is not the optimal route. The optimal route is set for each destination network address. In the non-disaster state, the route of the entry having the highest priority is set as the optimal route. The values "1", "2" and "3" are set sequentially in descending order of the priority. The entry with the less number of the combinations of AS numbers and area IDs, i.e., the less number of the selected set of the network groups NG1 to NG7, to be routed through to one identical destination network address has the higher priority. In the illustrated example of FIG. 10, the priority order "1" is set to the entry with the least number of network groups, i.e., three network groups NG2 (AS2+area ID 2), NG3 (AS3+Area ID 3) and NG7 (AS6+Area ID 6), to be routed through to the destination network address "G". The route of this entry with the priority order of "1" is set as the optimal route. In this entry, the IP address "B1" of the relay device 300d is set as the next hop in the route from the relay device 300a to the destination network address "G". The interface "IF1" is set as the interface corresponding to the relay device 300d of the next hop. The respective entries in the BGP table 350a are learnt and registered by the BGP routing protocol implemented on the relay device 300a.

The routing table 360x is structured as a table to record a list of routing information. The routing table 360x has the destination network address registered in correlation to the next hop and the interface. The contents of only the entries set as the optimal route in the BGP table 350x are registered in the routing table 360x. FIG. 11 illustrates a routing table 360a of the relay device 300a as a concrete example of the routing table 360x. The routing table 360x shown in FIG. 11 has the registry in the non-disaster state. In the illustrated example of the routing table 360a, the destination network address "G" is set in correlation to the next hop "B1" and the interface "IF1". This entry corresponds to the entry set as the optimal route for the destination network address "G" shown in the BGP table 350a of FIG. 10.

A-4. Routing Control

In the network system 1000 described above, the relay device 300x performs BGP-based optimization control of the relay route in the non-disaster state. On the occurrence of a disaster, i.e., when receiving a disaster notification from the disaster information management server 200, the relay device 300x changes the relay route according to the details of the disaster notification. The following describes the details of such routing control performed by the relay device 300x.

A-4-1. Format of Area ID Packet Used for Routing Control

Prior to description of the routing control performed by the relay device 300x, the following describes the format of an area ID packet used for routing control. The area ID packet is commonly used in the following three cases:

(1) First Case: Using as an area ID acquisition request packet when the relay device 300x sends a request for distribution of an area ID of the own relay device 300x to the disaster information management server 200;

(2) Second Case: Using as an area ID acquisition reply packet when the disaster information management server 200 distributes the area ID to the relay device 300x as a reply to the area ID acquisition request packet; and (3) Third Case: Using as a disaster notification packet when the disaster information management server 200 notifies the relay device 300x of the (predicted or actual) occurrence of a disaster in a specific area.

The format of the area ID packet is shown in FIG. 12. As illustrated, the area ID packet includes an ID header and a payload. The IP header is a header field of the third layer in the OSI reference model. The payload includes an area ID notification type field and an area ID field. Information for authentication or encryption may be added to the area ID packet to improve the security.

According to this embodiment, the setting of the value "1" in the area ID notification type field means that the area ID packet is used as the area ID acquisition request packet (First Case). The setting of the value "2" in the area ID notification type field means that the area ID packet is used as the area ID acquisition reply packet (Second Case). The setting of the value "3" in the area ID notification type field means that the area ID packet is used as the disaster notification packet (Third Case).

When the area ID packet is used as the area ID acquisition request packet, the value "0" is set in the area ID field. When the area ID packet is used as the area ID acquisition reply packet, the area ID of the location where the relay device 300x as the sender of the area ID acquisition request packet is located, is set in the area ID field. The setting of the area ID is registered in the disaster notification destination table 250 as described previously. When the area ID packet is used as the disaster notification packet, the area ID of the disaster area is set in the area ID field.

A-4-2. Outline of Routing Control

Figure 13:
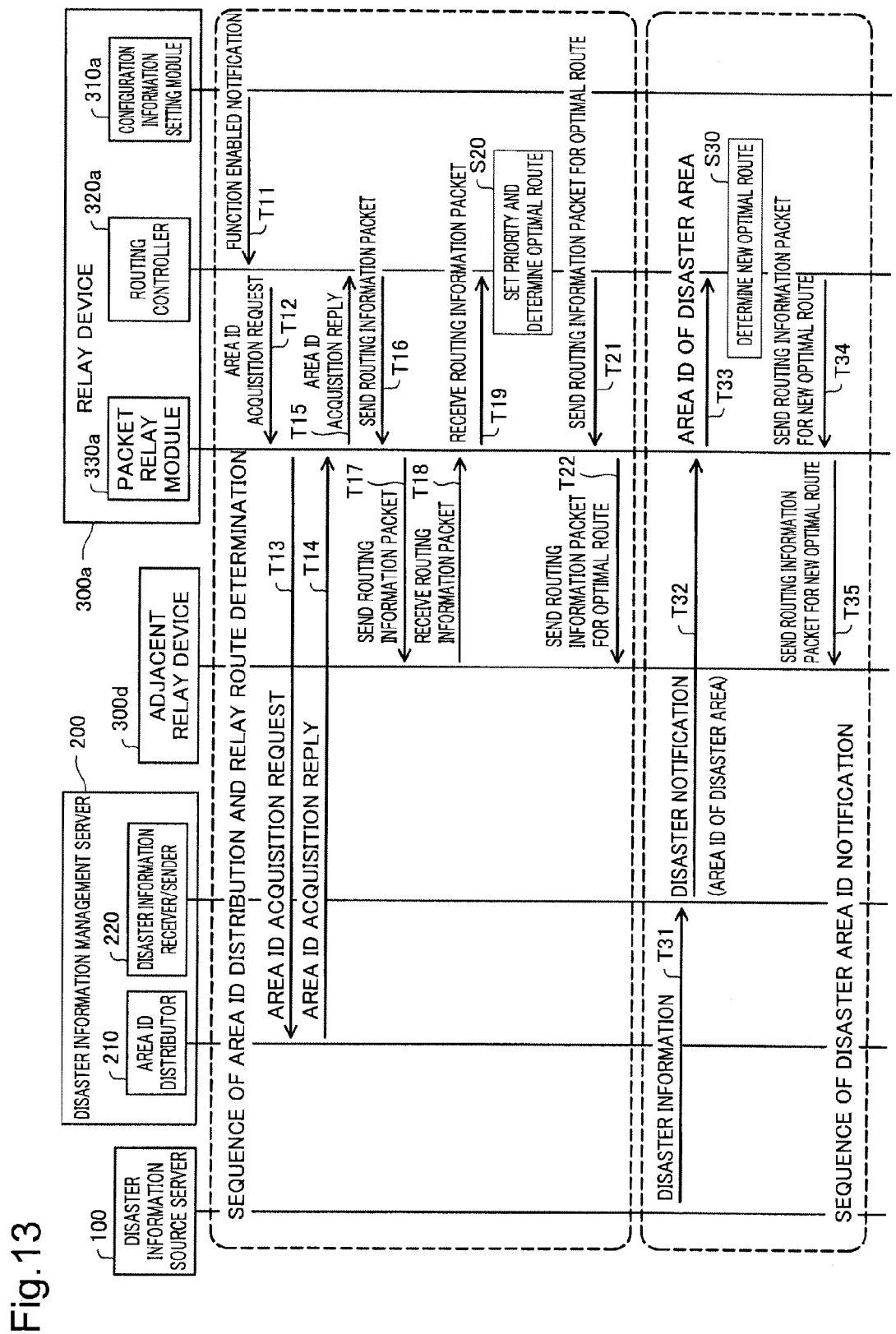
FIG. 13 shows a sequence of routing control in the network system.

The following describes the outline of routing control in the network system 1000. The flow of routing control is shown in FIG. 13. The routing control in the network system 1000 is divided into a phase (sequence) of area ID distribution and relay route determination before the occurrence of a disaster and a phase (sequence) of disaster area ID notification on the occurrence of a disaster. For convenience of explanation, FIG. 13 illustrates a process sequence performed between the disaster information source server 100, the disaster information management server 200 and the relay devices 300a and 300d. In the actual state, a similar process sequence is performed between the disaster information source server 100, the disaster information management server 200 and each relay device 300x.

As shown in FIG. 13, in the phase of area ID distribution and relay route determination, when the user sets the AS number, the area ID and the disaster notification source IP address and sets "ON" or "enabled" to the function ON-OFF state field in the device-specific table 340a of the relay device 300a, the configuration information setting module 310a sends a function enabled notification to the routing controller 320a (communication T11). The routing controller 320a subsequently sends an area ID acquisition request through the packet relay module 330a (communication T12) to the area ID distributor 210 of the disaster information management server 200 (communication T13), in order to obtain the area ID assigned to the relay device 300a.

The area ID distributor 210 of the disaster information management server 200 sends back an area ID acquisition reply through the packet relay module 330a of the relay device 300a (communication T14) to the routing controller 320a (communication T15), in order to distribute the area ID of the relay device 300a as the request source. When receiving the area ID acquisition reply, the routing controller 320a sends a routing information packet through the packet relay module 330a (communication T16) to the adjacent relay device 300d (communication T17), in order to transmit the own routing information of the relay device 300a to the adjacent relay device 300d. The routing information packet is sent to another relay device to learn the relay route. A similar process to that performed by the relay device 300a is performed by the adjacent relay device 300d, so that the adjacent relay device 300d sends the own routing information of the adjacent relay device 300d to the relay device 300a (communication T18).

When the relay device 300a receives the routing information from the relay device 300d (communication T19), the routing controller 320a sets the priority of the routing information and determines the optimal route, based on the received routing information (step S20). The routing controller 320a subsequently sends a routing information packet for the determined optimal route through the packet relay module 330a (communication T21) to the adjacent relay device 300d (communication T22). This concludes the phase (sequence) of area ID distribution and relay route determination.

As shown in FIG. 13, in the phase of disaster area ID notification, on the occurrence of a large-scale disaster, the disaster information source server 100 notifies the disaster information receiver/sender 220 of the disaster information management server 200 of disaster information DI (communication T31). When receiving the disaster information DI, the disaster information receiver/sender 220 notifies the area ID of a disaster area through the packet relay module 330a of the relay device 300a (communication T32) to the routing controller 320a (communication T33).

When receiving the area ID of the disaster area, the routing controller 320a determines a new optimal route, based on the received area ID (step S30). In other words, the processing at this step S30 changes the current optimal route to an alternative route. The routing controller 320a sends a routing information packet for the determined new optimal route through the packet relay module 330a (communication T34) to the adjacent relay device 300d (communication T35). This concludes the phase (sequence) of disaster area ID notification. The following describes the details of the respective processes in this process sequence.

A-4-3. Setting Process

The following describes the details of setting process performed by the relay device 300x. The setting process sets the configuration information for the routing control and corresponds to the communication T11 shown in FIG. 13. The setting process is triggered when the user starts the operation to set the configuration information.

Figure 14:
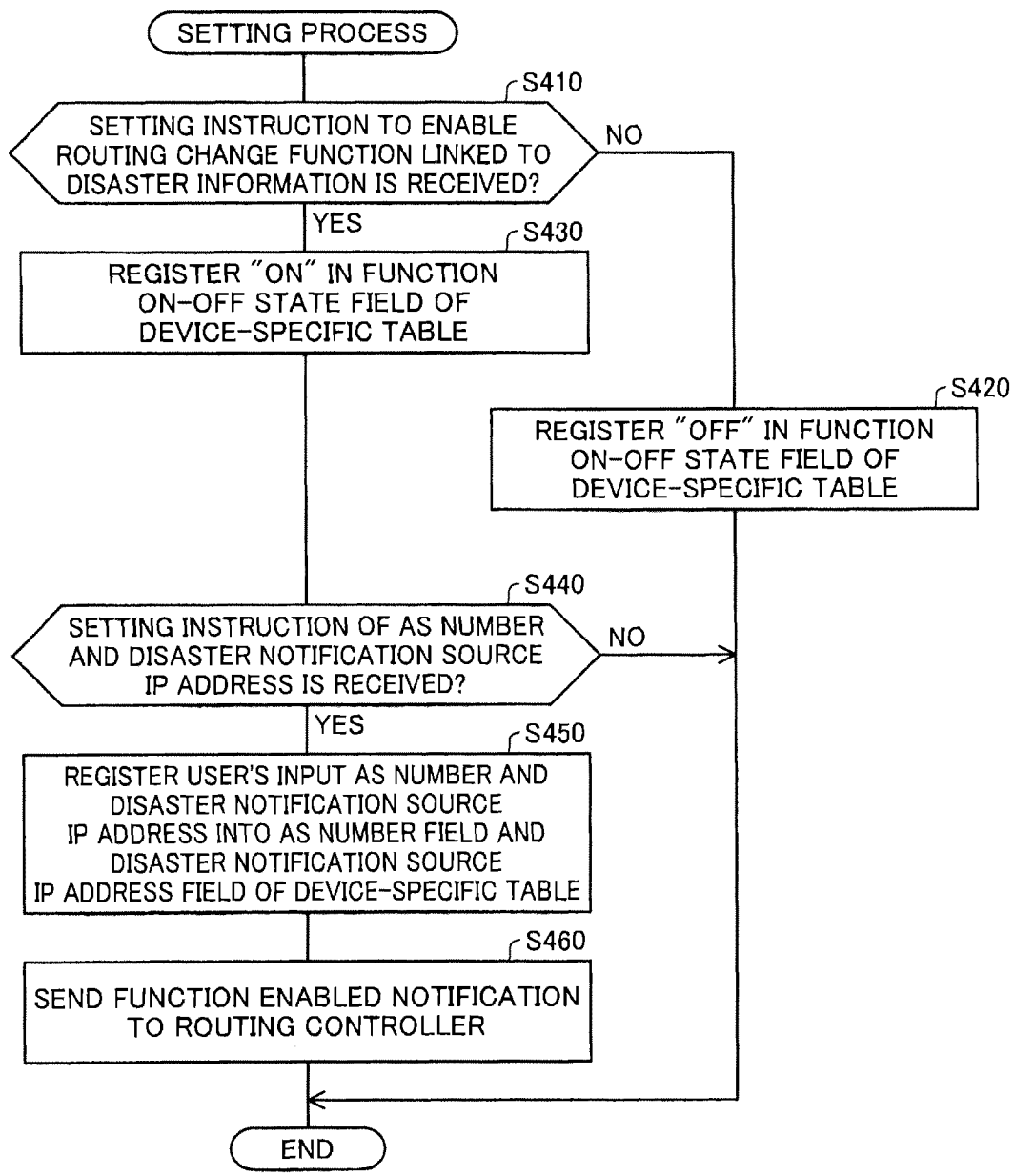
FIG. 14 is a flowchart showing a procedure of setting process performed by the relay device.

The flow of setting process is shown in FIG. 14. On the start of the setting process, the configuration information setting module 310x of the relay device 300x determines whether a setting instruction to enable the routing change function linked to the disaster information is received as the user's entry (step S410). When no setting instruction is received (step S410: NO), the configuration information setting module 310x registers "OFF" or "disabled" in the function ON-OFF state field of the device-specific table 340x (step S420) and terminates this processing flow.

When the setting instruction is received (step S410: YES), on the other hand, the configuration information setting module 310x registers "ON" or "enabled" in the function ON-OFF state field of the device-specific table 340x (step S430). The configuration information setting module 310x subsequently determines whether the AS number, the disaster notification source IP address and their setting instruction are received as the user's entry (step S440).

When no setting instruction is received (step S440: NO), the configuration information setting module 310x terminates this processing flow. When the setting instruction is received (step S440: YES), on the other hand, the configuration information setting module 310x registers the received AS number and the received disaster notification source IP address respectively into the AS number field and the disaster notification source IP address field of the device-specific table 340x (step S450). The area ID obtained by the communications T13 and T14 shown in FIG. 13 is registered in the area ID field of the device-specific table 340x (described later in detail). According to another embodiment, when the user enters the area ID, in addition to the AS number and the disaster notification source IP address, the configuration information setting module 310x may additionally determine whether the area ID is received at step S440 and may additionally register the received area ID into the area ID field of the device-specific table 340x at step S450. In other words, the area ID may be obtained dynamically by the communications T13 and T14 or may be set statically by the user's entry.

After registration of the AS number and the disaster notification source IP address, the configuration information setting module 310x sends a function enabled notification to the routing controller 320x (step S460) and terminates this setting process.

A-4-4. Area ID Distribution Process

The following describes the area ID distribution process performed by the disaster information management server 200. The area ID distribution process distributes the area ID of the area where the relay device 300x as the request source is located in response to the request from the relay device 300x and corresponds to the communication T14 shown in FIG. 13. The area ID distribution process is repeatedly performed during the operation of the disaster information management server 200.

Figure 15:
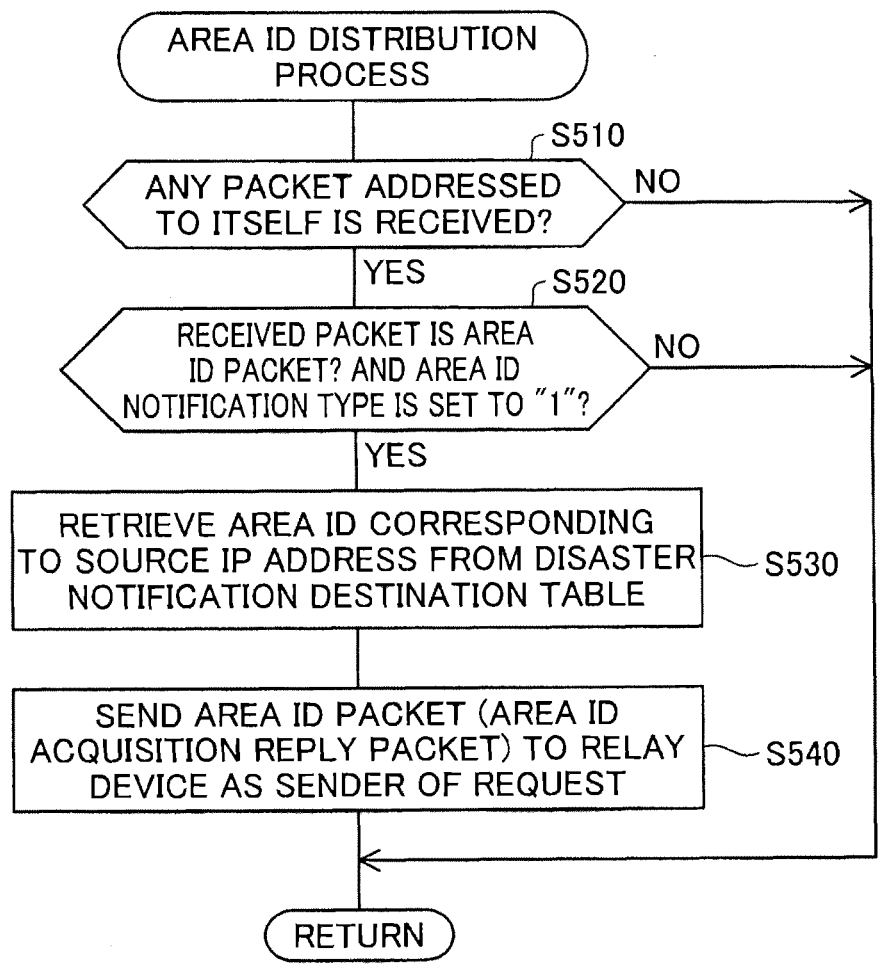
FIG. 15 is a flowchart showing a procedure of area ID distribution process performed by the disaster information management server.

The flow of area ID distribution process is shown in FIG. 15. On the start of the area ID distribution process, the area ID distributor 210 of the disaster information management server 200 determines whether any packet addressed to itself is received (step S510). When no packet addressed to itself is received (step S510: NO), the area ID distributor 210 goes to RETURN. When any packet addressed to itself is received (step S510: YES), on the other hand, the area ID distributor 210 subsequently determines whether the received packet is an area ID packet and whether its area ID notification type is set to "1" (step S520). The area ID packet with the setting of "1" to the area ID notification type means that the packet is the area ID acquisition request packet.

When the received packet is not the area ID acquisition request packet (step S520: NO), the area ID distributor 210 goes to RETURN. When the received packet is the area ID acquisition request packet (step S520: YES), on the other hand, the area ID distributor 210 searches the disaster notification destination table 250 with the source IP address of the area ID acquisition request packet as a search key and retrieves an area ID corresponding to the source IP address (step S530). The retrieved area ID represents the area where the relay device 300x as the sender of the area ID acquisition request packet is located.

After retrieval of the area ID, the area ID distributor 210 sends back an area ID packet to the relay device 300x as the sender of the area ID acquisition request packet (step S540). In this case, the value "2" is set in the area ID notification type field of this area ID packet. The setting of "2" means that the area ID packet is the area ID acquisition reply packet. The area ID retrieved at step S530 is set in the area ID field of this area ID packet. After sending the area ID packet, the relay device 300x goes to RETURN.

A-4-5. Disaster Notification Process

The following describes the disaster notification process performed by the disaster information management server 200. When receiving information on the occurrence of a disaster or prediction for the occurrence of a disaster, the disaster information management server 200 performs this disaster notification process to notify the relay device 300x of the disaster area where the disaster occurs or the disaster is predicted. This disaster notification process corresponds to the communication T32 shown in FIG. 13. The disaster notification process is repeatedly performed during the operation of the disaster information management server 200.

Figure 16:
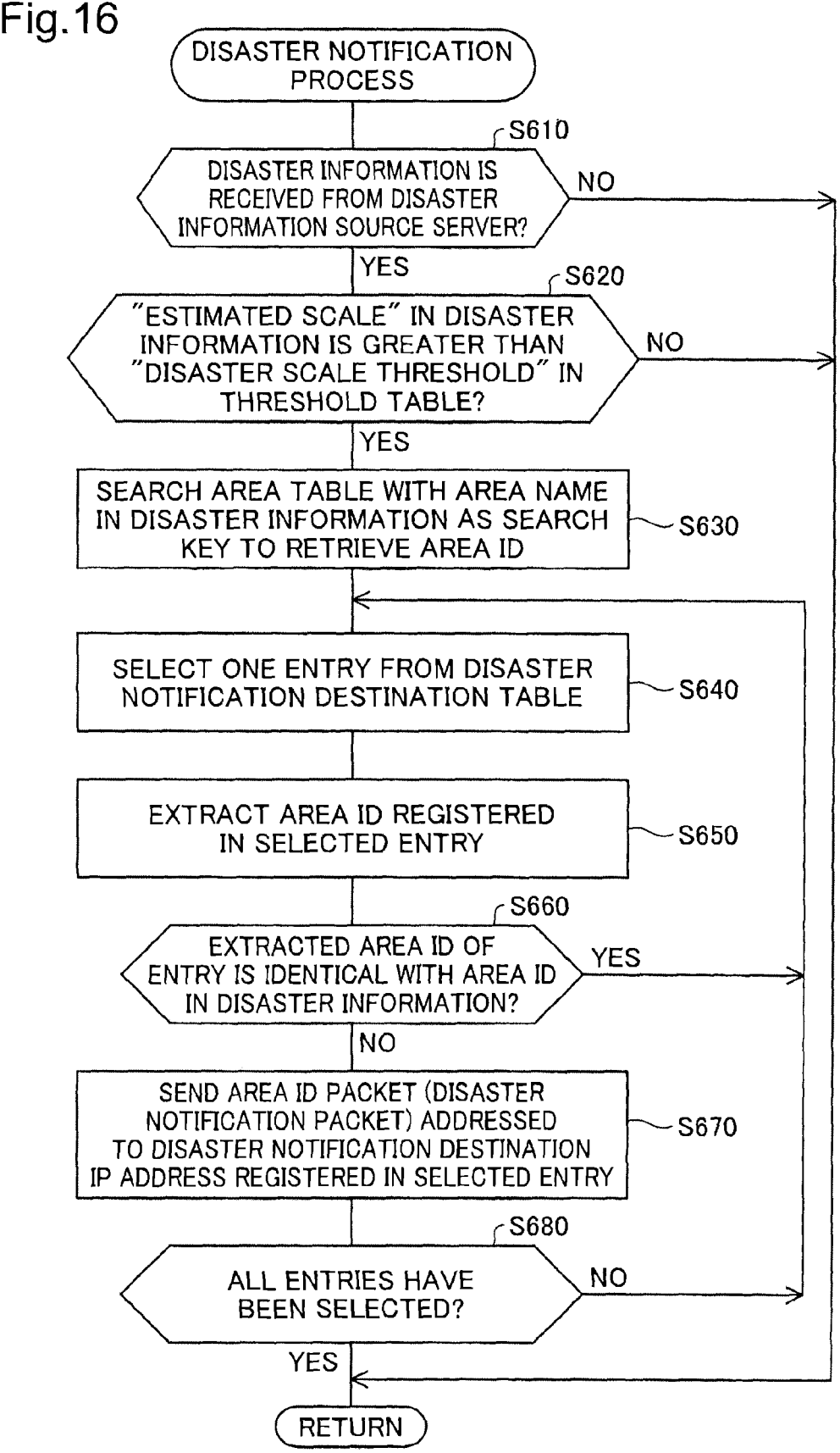
FIG. 16 is a flowchart showing a procedure of disaster notification process performed by the disaster information management server.

The flow of disaster notification process is shown in FIG. 16. On the start of the disaster notification process, the disaster information receiver/sender 220 of the disaster information management server 200 determines whether the disaster information DI is received from the disaster information source server 100 (step S610). When no disaster information DI is received (step S610: NO), the disaster information receiver/sender 220 goes to RETURN. When the disaster information DI is received (step S610: YES), on the other hand, the disaster information receiver/sender 220 analyzes the contents of the received disaster information DI and determines whether an estimated disaster scale included in the disaster information DI is greater than the disaster scale threshold TH stored in the threshold table 230 (step S620).

When the estimated disaster scale is not greater than the disaster scale threshold TH (step S620: NO), the disaster information receiver/sender 220 goes to RETURN. When the estimated disaster scale is greater than the disaster scale threshold TH (step S620: YES), on the other hand, the disaster information receiver/sender 220 searches the area table 240 with an area name included in the received disaster information DI as a search key and retrieves an area ID corresponding to the area name from the area table 240 (step S630). The retrieved area ID represents the disaster area where the disaster occurs or the disaster is predicted.

The disaster information DI may include a plurality of different area names. In this case, the area ID corresponding to any one of the plurality of area names included in the disaster information DI may be retrieved. According to another embodiment, a plurality of different area IDs may be retrieved corresponding to one area name included in the disaster information DI. For example, the area ID "4" and the area ID "5" may be retrieved from the area table 240 shown in FIG. 6 corresponding to the area name "Nagano Prefecture" included in the disaster information DI. As clearly understood from this explanation, there is no need that the area name included in the disaster information DI is perfectly identical with the area name registered in the area table 240 under the search at step S630. For example, an area ID corresponding to the area name of a wider region including the area specified by the area name included in the disaster information DI may be retrieved from the area table 240. In another example, an area ID corresponding to the area name of a narrower location included as part of the area specified by the area name included in the disaster information DI may be retrieved from the area table 240.

After retrieving the area ID, the disaster information receiver/sender 220 selects one entry among the unselected entries in the disaster notification destination table 250 (step S640). After selection of one entry, the disaster information receiver/sender 220 extracts the area ID registered in the selected entry (step S650). The disaster information receiver/sender 220 determines whether the area ID extracted at step S650 is identical with the area ID retrieved at step S630 (step S660).

When the area ID extracted at step S650 is identical with the area ID retrieved at step S630 (step S660: YES), this means that the area ID extracted at step S650 corresponds to the area name included in the disaster information DI. In other words, the relay device 300x with assignment of a disaster notification destination IP address in the disaster notification destination table 250 correlated to the area ID extracted at step S650 is located in the disaster area where the disaster occurs or the disaster is predicted. According to this embodiment, the disaster notification is not sent to the relay device located in the disaster area. This aims to prevent a further increase of the network load in the disaster area, since the disaster area is expected to have a significant increase of the network load by the communications for safety confirmation and the communications of routing information packets for changing the relay route. The disaster notification is sent by the relay device 300x to establish a new relay route bypassing the disaster area. There is accordingly less significance of sending the disaster notification to the relay device 300x located in the disaster area. The disaster information receiver/sender 220 accordingly returns the processing flow to step S640. According to another embodiment, the disaster notification may also be sent to the relay device located in the disaster area.

When the area ID extracted at step S650 is not identical with the area ID retrieved at step S630 (step S660: NO), on the other hand, the disaster information receiver/sender 220 sends an area ID packet addressed to the disaster notification destination IP address registered in the selected entry (step S670). In this case, the value "3" is set in the area ID notification type field of this area ID packet. The setting of "3" means that the area ID packet is the disaster notification packet. The area ID retrieved at step S630 is set in the area ID field of this area ID packet. This area ID represents the disaster area.

After sending the area ID packet (disaster notification packet), the disaster information receiver/sender 220 determines whether all the entries have been selected from the disaster notification destination table 250 at step S640 (step S680). When there is any entry that has not yet selected (step S680: NO), the disaster information receiver/sender 220 returns the processing flow to step S640. When all the entries have been selected (step S680: YES), on the other hand, the disaster information receiver/sender 220 goes to RETURN. The disaster information receiver/sender 220 accordingly sends the disaster notification packet to the relay devices other than the relay device located in the disaster area, among all the relay devices 300x having the registry of the IP addresses in the disaster notification destination table 250.

A-4-6. Routing Control Process

The following describes the routing control process performed by the relay device 300x. The routing control process learns the routing information by communication with another relay device and determines the relay route based on the result of machine learning. When a disaster occurs or the occurrence of a disaster is predicted, the routing control process changes the current relay route to a new relay route that bypasses the disaster area. This routing control process corresponds to the communications T15 to T22, communications T33 to T35, and steps S20 and S30 shown in FIG. 13. The routing control process is repeatedly performed ruing the operation of the relay device 300x.

Figure 17:
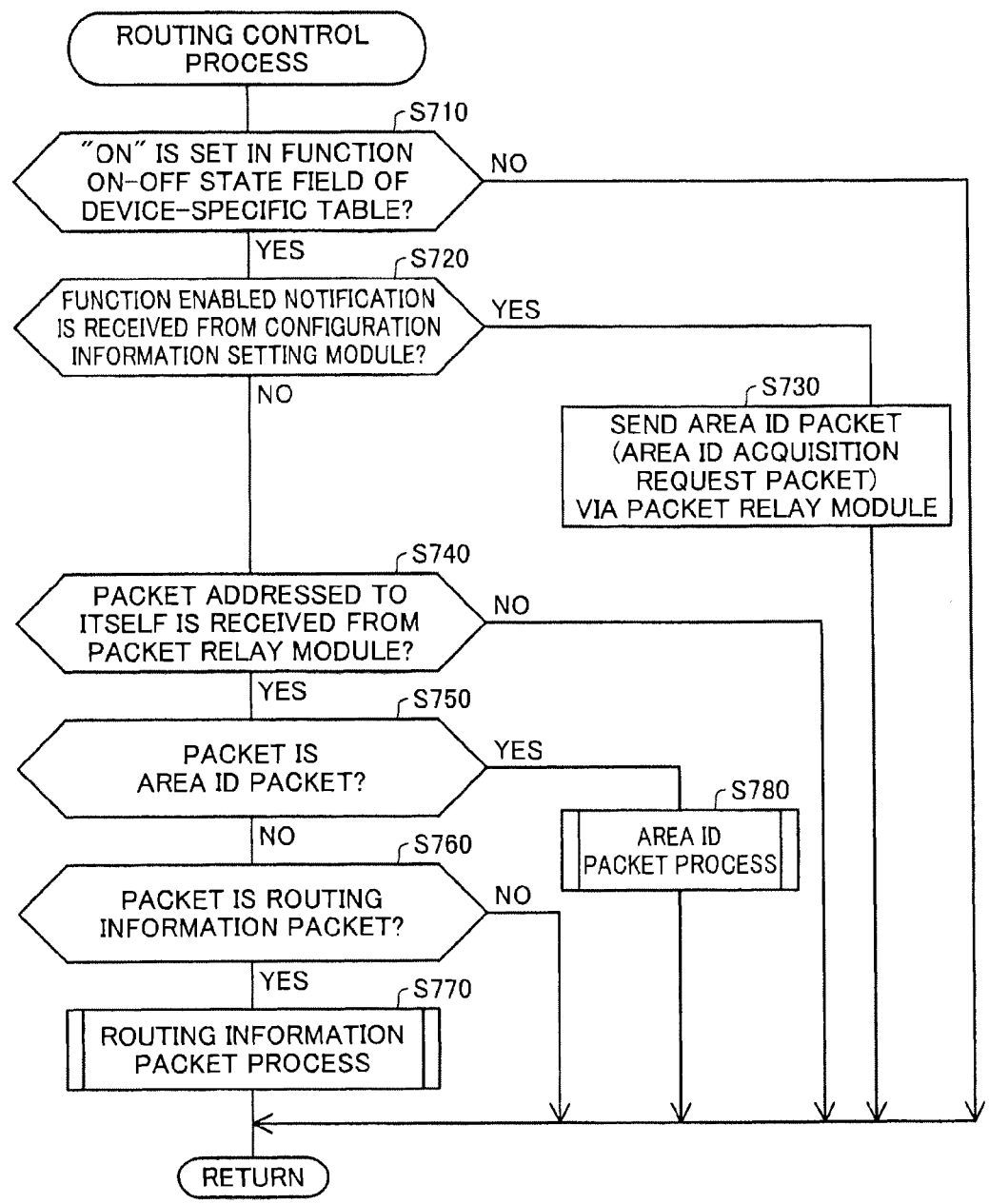
FIG. 17 is a flowchart showing a procedure of routing control process performed by the relay device.

The flow of routing control process is shown in FIG. 17. On the start of the routing control process, the routing controller 320x of the relay device 300x determines whether "ON" is set in the function ON-OFF state field of the device-specific table 340x (step S710). When "OFF" is set in the function ON-OFF state field (step S710: NO), the routing controller 320x goes to RETURN.

When "ON" is set in the function ON-OFF state field (step S710: YES), on the other hand, the routing controller 320x subsequently determines whether the function enabled notification (step S460 described above) is received from the configuration information setting module 310x (step S720). This determines whether the current timing is immediately after execution of the setting process. According to this embodiment, the area ID stored in the device-specific table 340x is dynamically obtained from the disaster information management server 200. Immediately after execution of the setting process, the area ID of the own relay device 300x has not yet been stored in the area ID field of the device-specific table 340x.

When the function enabled notification is received (step S720: YES), the area ID of the own relay device 300x has not yet been stored in the area ID field of the device-specific table 340x. The routing controller 320x accordingly sends an area ID packet via the packet relay module 330x (step S730) and goes to RETURN. The area ID packet is sent here to receive distribution of the area ID of the own relay device 300x from the disaster information management server 200. In this case, the value "1" is set in the area ID notification type field of this area ID packet. The setting of "1" means that the area ID packet is the area ID acquisition request packet.

When no function enabled notification is received (step S720: No), on the other hand, the area ID of the own relay device 300x has already been stored in the area ID field of the device-specific table 340x. Alternatively the routing controller 320x has sent the area ID acquisition request to the disaster information management server 200 and waits for a reply of the area ID. There is accordingly no need of newly requesting the area ID of the own relay device 300. The routing controller 320x then determines whether any packet addressed to the own relay device 300x is received from the packet relay module 330x (step S740).

When no packet addressed to the own relay device 300x is received (step S740: NO), the routing controller 320x goes to RETURN. When a packet addressed to another relay device 300x is received, the routing controller 320x sends the received packet via the packet relay module 330x to a route with the network address included in the destination IP address of the received packet that is identical with the destination network address registered in the routing table 360x. More specifically, the routing controller 320x sends a forwarding instruction of the received packet to the packet relay module 330x. The packet relay module 330x sends the packet from the interface module 370x to the route, based on the forwarding instruction from the routing controller 320x. When the packet addressed to the own relay device 300x is received (step S740: YES), on the other hand, the routing controller 320x subsequently determines whether the received packet is an area ID packet (step S750).

When the received packet is not the area ID packet (step S750: NO), the routing controller 320x subsequently determines whether the received packet is a routing information packet (step S760). When the received packet is not the routing information packet (step S760: NO), the routing controller 320x goes to RETURN.

When the received packet is the routing information packet (step S760: YES), on the other hand, the routing controller 320x performs a routing information packet process (step S770) and goes to RETURN. The routing information packet process corresponds to the communications T16 to T22 and step S20 shown in FIG. 13. The details of the routing information packet process will be described below. When the received packet is the area ID packet (step S750: YES), on the other hand, the routing controller 320x performs an area ID packet process (step S780) and goes to RETURN. The area ID packet process corresponds to the communication T15, communications T33 to T35 and step S30 shown in FIG. 13. The details of the area ID packet process will be described later.

A-4-6-1. Routing Information Packet Process

The following describes the format of the routing information packet and subsequently the routing information packet process. The format of the routing information packet is shown in FIG. 18. The routing information packet is used for exchange of routing information between the relay devices 300x. This embodiment employs the BGP-based format of the routing information packet.

More specifically, as shown in FIG. 18, the routing information packet includes a BGP message header and UPDATE message data for update of the route. The UPDATE message data includes a pass segment type field, a pass segment length field and a pass segment setting field. In the pass segment type field, a pass segment type representing the area ID combined with the AS number is newly defined and added to the conventional BGP-based pass segment type. In the pass segment setting field, the combinations of AS numbers and area IDs to be routed through are registered as the list (hereinafter referred to as "AS_PATH attribute"). The pass segment length field shows the number of the combinations of AS numbers and area IDs registered in the pass segment setting field.

Adding the new pass segment type and pass segment setting to the conventional BGP-based format of the routing information packet enables easy exchange of routing information between the relay devices 300x. According to another embodiment, a dedicated format may be newly created and used as the format of the routing information packet.

Figure 19:
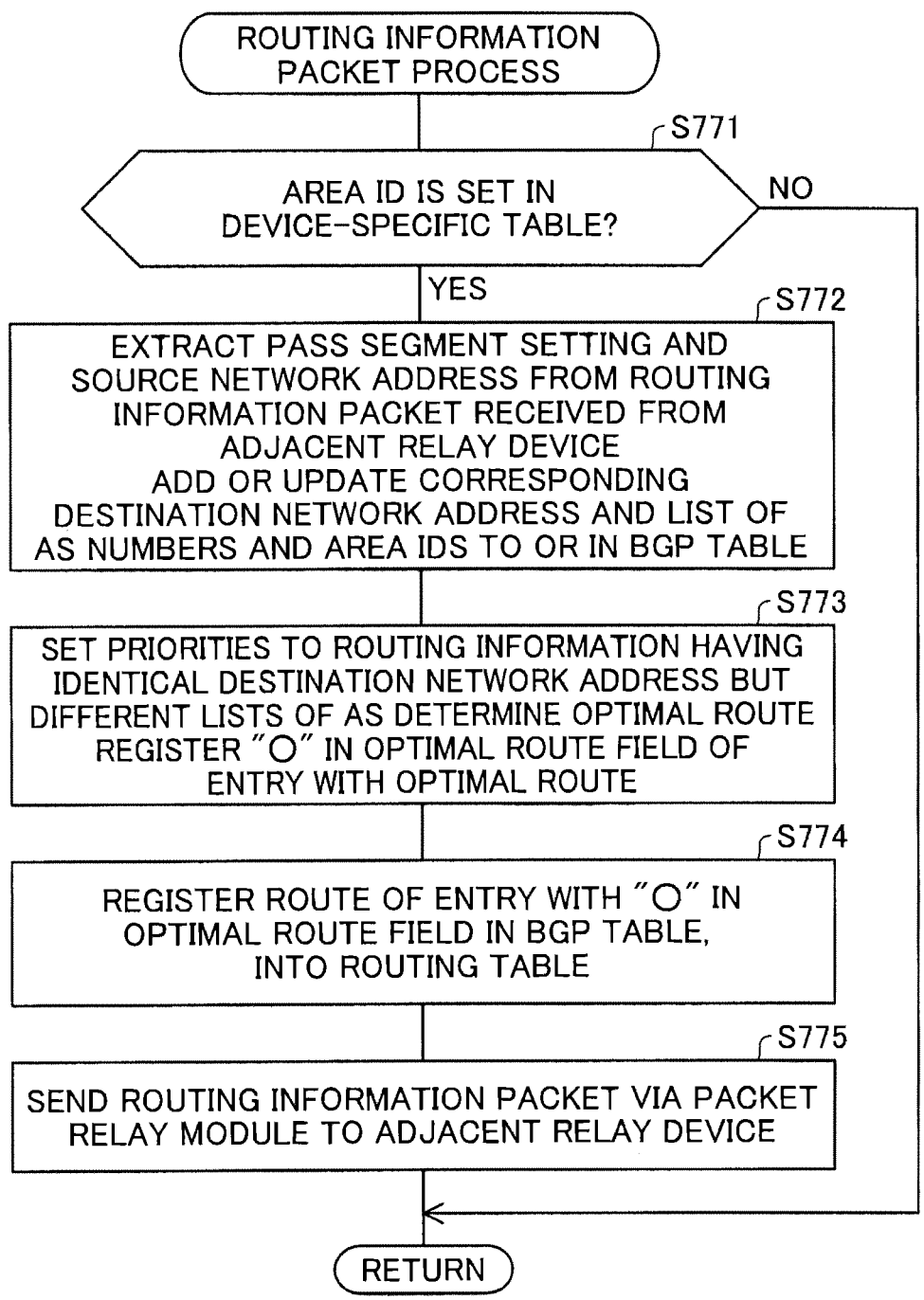
FIG. 19 is a flowchart showing a procedure of routing information packet process in the routing control process.

The flow of routing information packet process is shown in FIG. 19. On the start of the routing information packet process, the routing controller 320x determines whether the area ID is set in the device-specific table 340x (step S771). When the area ID is not set in the device-specific table 340x (step S771: NO), the routing controller 320x returns the processing flow to the routing control process shown in FIG. 17.

When the area ID is set in the device-specific table 340x (step S771: YES), on the other hand, the routing controller 320x extracts the pass segment setting from the routing information packet received from the adjacent relay device 300x, extracts the network address from the source IP address of the routing information packet, and adds or updates the corresponding destination network address and the list of AS numbers and area IDs to or in the BGP table 350x (step S772). The routing controller 320x learns the relay route based on the received routing information packet in this manner.

After addition to or update of the BGP table 350x, the routing controller 320x sets the priorities to multiple pieces of routing information having an identical destination network address but different lists of AS numbers and area IDs, determines the optimal route based on the priorities and registers the open circle symbol "o" in the optimal route field of the entry with the determined optimal route in the BGP table 350x (step S773). According to this embodiment, before reception of a disaster notification, the determined optimal route is the route of the entry having the highest priority, i.e., the relay route having the less number of the combinations of AS numbers and area IDs to be routed through, as shown in FIG. 10.

After registration of the open circle symbol "o" in the optima route field in the BGP table 350x, the routing controller 320x registers the route of the entry having the registry of the open circle symbol "o" in its optimal route field in the BGP table 350x, into the routing table 360x (step S774). The routing controller 320x subsequently sends a routing information packet via the packet relay module 330x to the adjacent relay device 300x (step S775). The pass segment type representing the AS_PATH attribute with addition of the area ID is registered in the pass segment type field of this routing information packet. The list of AS numbers and area IDs with addition of the AS number and the area ID of the own relay device 300x in the entry having the registry of the open circle symbol "O" in its optimal route field is registered in the pass segment setting field of this routing information packet. This concludes the routing information packet process.

Figure 20:
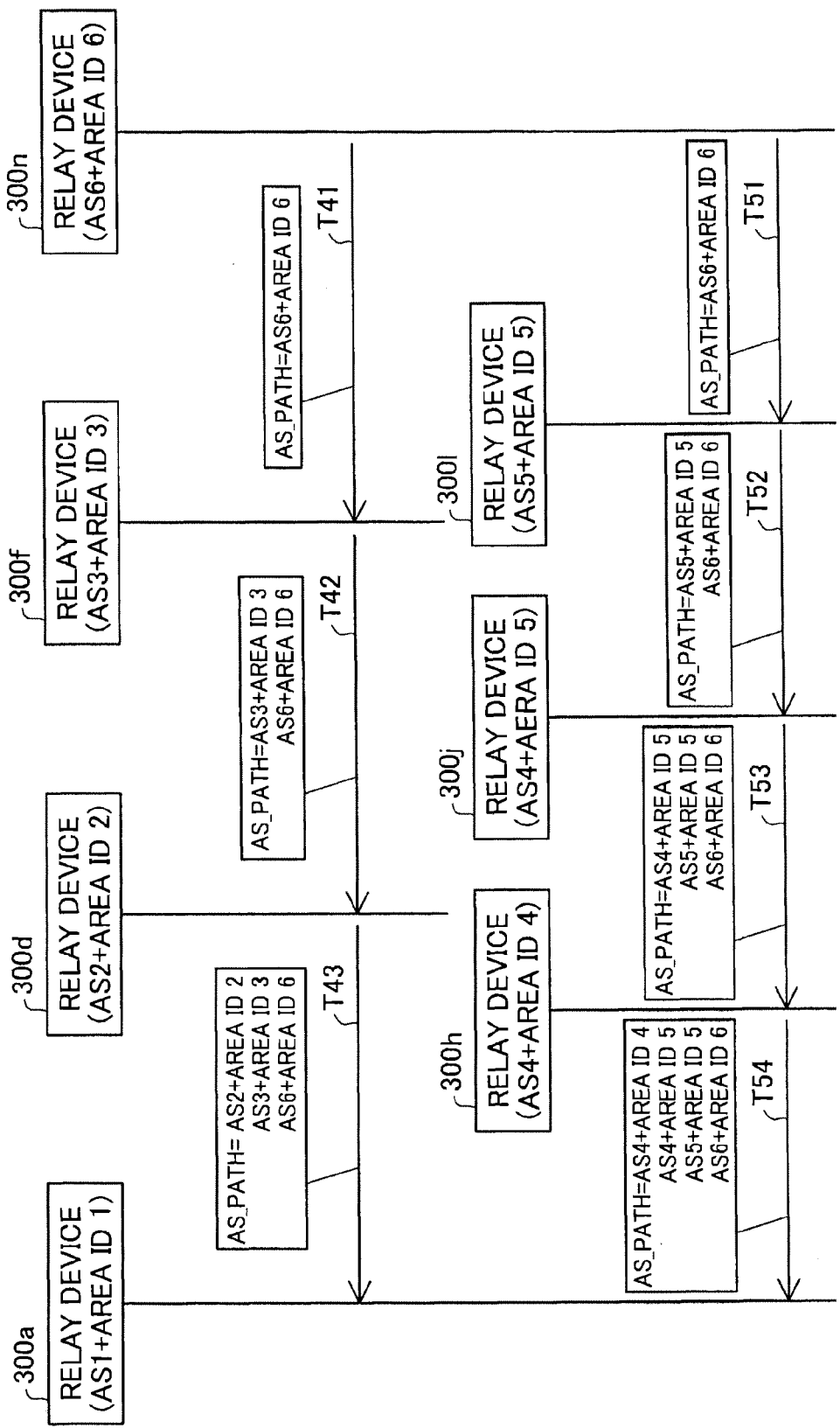
FIG. 20 shows a sequence of learning a relay route by the relay device according to the routing information packet process.

FIG. 20 shows a sequence of learning the relay route by each relay device 300x according to the routing information packet process described above. The illustrated example shows a process by which the relay device 300a learns the relay route from the relay device 300n to the relay device 300a. As shown in FIG. 20, the relay device 300n first sends a routing information packet to the adjacent relay device 300f (communication T41). The setting "AS6+Area ID 6" assigned to the own relay device 300n is registered in the pass segment setting field of this routing information packet. The AS_PATH attribute of the routing information packet received by the relay device 300f is accordingly "AS6+Area ID 6". The communication T41 is based on either step S783 or step S790 of the area ID packet process described later.

The relay device 300f receives the routing information packet sent from the relay device 300n, adds the setting "AS3+Area ID 3" assigned to the own relay device 300f at the head of the pass segment setting field, and sends the routing information packet with such addition to the adjacent relay device 300d (communication T42). The AS_PATH attribute of the routing information packet received by the relay device 300d is accordingly "AS3+Area ID 3, AS6+Area ID 6".

The relay device 300d receives the routing information packet sent from the relay device 300f, adds the setting "AS2+Area ID 2" assigned to the own relay device 300d at the head of the pass segment setting field, and sends the routing information packet with such addition to the adjacent relay device 300a (communication T43). The AS_PATH attribute of the routing information packet received by the relay device 300a is accordingly "AS2+Area ID 2, AS3+Area ID 3, AS6+Area ID 6". By this process, the relay device 300a learns the setting "AS2+Area ID 2, AS3+Area ID 3, AS6+Area ID 6" as the AS_PATH attribute of one relay route from the relay device 300n to the relay device 300a.

Similarly, by sending a routing information packet in the sequence of the relay devices 300n, 300l, 300j, 300h and 300a (communications T51 to T54), the relay device 300a learns the setting "AS4+Area ID4, AS4+Area ID 5, AS5+Area ID 5, AS6+Area ID 6" as the AS_PATH attribute of another relay route from the relay device 300n to the relay device 300a.

A-4-6-2. Area ID Packet Process

Figure 21:
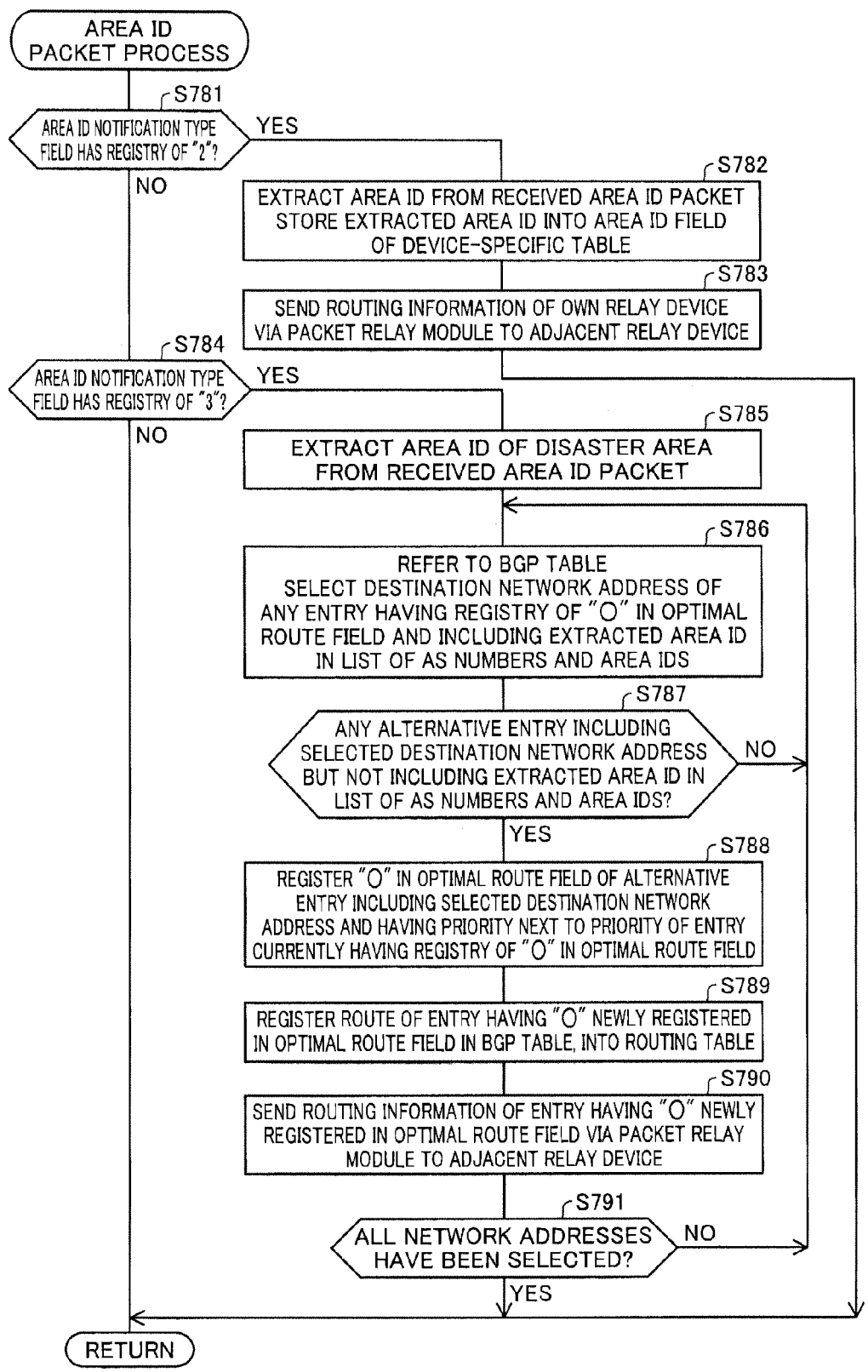
FIG. 21 is a flowchart showing a procedure of an area ID packet process in the routing control process.

The following describes the area ID packet process. The flow of the area ID packet process is shown in FIG. 21. On the start of the area ID packet process, the routing controller 320x determines whether the received area ID packet has the registry of "2" in its area ID notification type field, i.e., whether the received area ID packet is the area ID acquisition reply packet (step S781).

When the received area ID packet is the area ID acquisition reply packet (step S781: YES), the routing controller 320x extracts the area ID from the area ID field of the received area ID packet and gives an instruction to the configuration information setting module 310x to store the extracted area ID into the area ID field of the device-specific table 340x (step S782).

After storage of the area ID, the routing controller 320x sends a routing information packet including registry of the routing information of the own relay device 300x via the packet relay module 330x to the adjacent relay device 300x (step S783). The pass segment type representing the AS_PATH attribute with addition of the area ID is registered in the pass segment type field of this routing information packet. The AS number and the area ID assigned to the own relay device 300x are registered in the pass segment setting field of this routing information packet. After sending the routing information packet, the routing controller 320x returns the processing flow to the routing control process.

When the received area ID packet is not the area ID acquisition relay packet (step S781: NO), on the other hand, the routing controller 320x subsequently determines whether the received area ID packet has the registry of "3" in its area ID notification type field, i.e., whether the received area ID packet is the disaster notification packet (step S784).

When the received area ID packet is not the disaster notification packet (step S784: NO), the routing controller 320x returns the processing flow to the routing control process. When the received area ID packet is the disaster notification packet (step S784: YES), on the other hand, the routing controller 320x extracts the area ID from the area ID field of the received area ID packet (step S785). The extracted area ID represents the disaster area.

After extraction of the area ID, the routing controller 320x refers to the BGP table 350x and selects one destination network address of any entry having the registry of the open circle symbol "o" in its optimal route field and including the extracted area ID in its list of AS numbers and area IDs (step S786). After selecting one destination network address, the routing controller 320x determines whether there is any alternative entry including the selected destination network address but not including the extracted area ID in its list of AS numbers and area IDs (step S787). When there is no entry meeting these conditions (step S787: NO), the routing controller 320x returns the processing flow to step S786 and selects another destination network address of any unselected entry satisfying the conditions of step S786.

When there is any entry meeting the above conditions (step S787: YES), on the other hand, the routing controller 320x registers the open circle symbol "o" in the optimal route field of an alternative entry including the selected destination network address and having the priority next to the priority of the entry currently having the registry of the open circle symbol "o" in its optimal route field (step S788). This resets the optimal route to the relay route having the highest priority among the relay routes that do not include the disaster area.

After changing the optimal route, the routing controller 320x registers the relay route of the entry having the newly registered open circle symbol "o" in its optimal route field in the BGP table 350x, into the routing table 360x (step S789). The relay route is accordingly changed from the relay route including the disaster area to the relay route having the highest priority among the relay routes that do not include the disaster area.

After changing the relay route, the routing controller 320x sends a routing information packet including registry of new routing information with the open circle symbol "o" newly registered in its optimal route field via the packet relay module 330x to the adjacent relay device 300x (step S790). The pass segment type representing the AS_PATH attribute with addition of the area ID is registered in the pass segment type field of this routing information packet. The list of AS numbers and area IDs in the entry having the registry of the open circle symbol "o" in its optimal route field is registered in the pass segment setting field of this routing information packet. The relay device 300x learns the changed new relay route by receiving this routing information packet.

After sending the routing information packet, the routing controller 320x determines whether all the destination network addresses of the entries meeting the conditions of step S786 have been selected (step S791). When there is any destination network address of any other entry that meets the conditions but has not yet been selected (step S791: NO), the routing controller 320x returns the processing flow to step S786 and selects another destination network address of any other unselected entry meeting the conditions of step S786. When all the destination network addresses of the entries meeting the conditions of step S786 have already been selected (step S791: YES), on the other hand, the routing controller 320x returns the processing flow to the routing control process.

Figure 22:
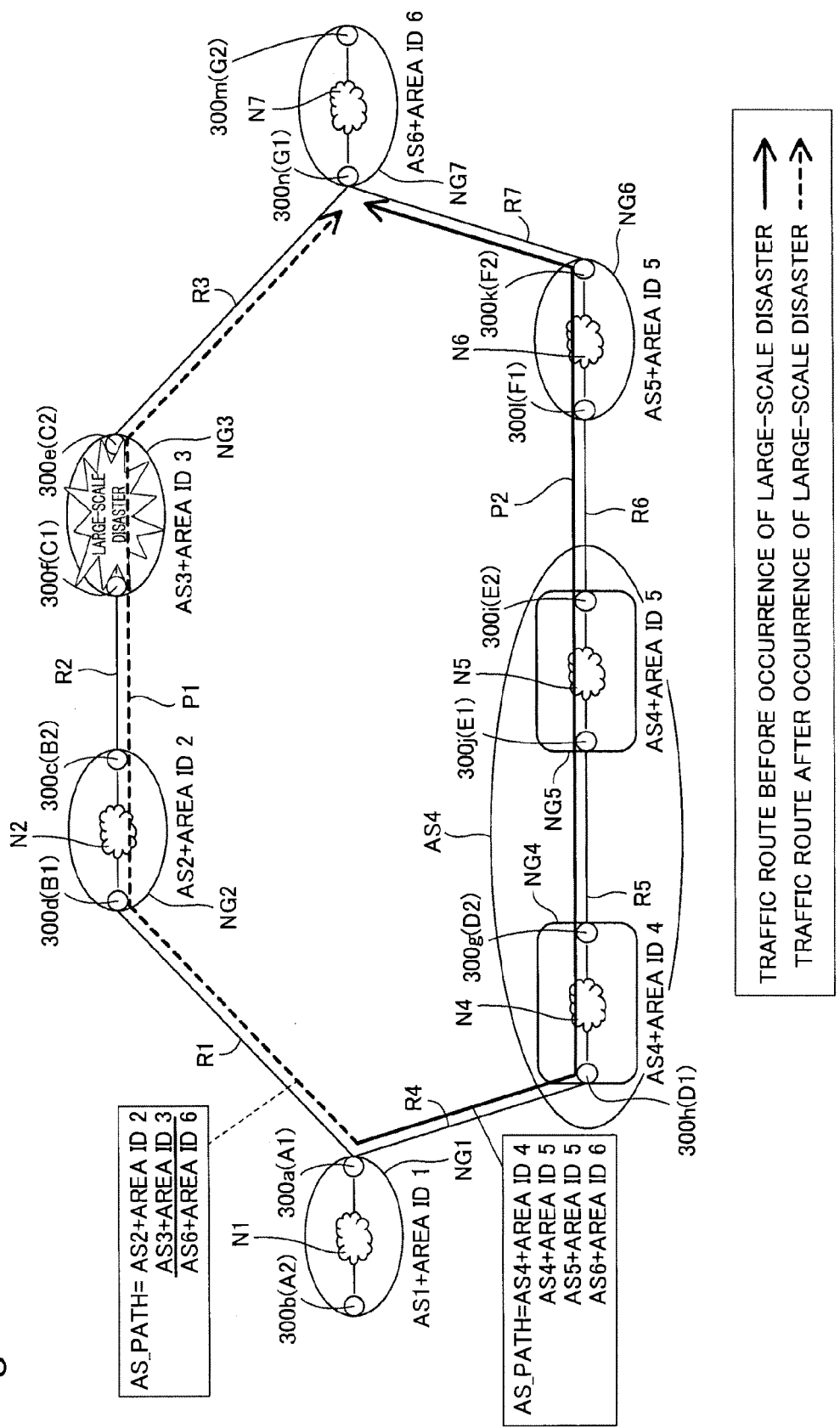
FIG. 22 shows a concrete example of changing a relay route by the routing control process.

FIG. 22 illustrates a concrete example of changing the relay route according to the routing control process described above. As shown in FIG. 22, before the occurrence of a disaster, a communication path P1 going through the relay devices 300c to 300f is set by the routing control process described above as the relay route between the relay device 300a and the relay device 300n in the network system 1000.

The BGP table 350a is in the state of FIG. 10 described above. More specifically, there are two entries including the destination network address "G" in the BGP table 350a as shown in FIG. 10. The open circle symbol "o" is set in the optimal route field of the entry having the priority of "1" between these two entries. In other words, the open circle symbol "o" is set in the optimal route field of the entry having the AS_PATH attribute with the least number of hops "AS2+Area ID 2, AS3+Area ID 3, AS6+Area ID 6". Such setting enables the efficient relay of a packet.

The routing table 360a is in the state of FIG. 11 described above. More specifically, "B1" corresponding to the entry having the registry of the open circle symbol "o" in its optimal route field in the BGP table 350a, i.e., the relay device 300d, is registered as the next hop of the destination network address "G" in the routing table 360a as shown in FIG. 11.

Here it is assumed that a large-scale disaster occurs in the location area where the network group NG3 is located (area ID="3"). On this occurrence, the relay device 300a receives a disaster notification packet including the area ID 3 from the disaster information management server 200. The entry with the registry of the open circle symbol "o" in its optimal route field and the destination network address "G" has the AS_PATH attribute including the area ID 3 representing the disaster area in its list of AS numbers and area IDs. The relay device 300a accordingly updates the BGP table 350a at step S788 described above.

FIG. 23 shows the contents of the BGP table 350a after the update. As illustrated, in the updated BGP table 350a, the open circle symbol "o" is set in the optimal route field of the entry having the priority of "2" between the two entries including the destination network address "G". This entry has the AS_PATH attribute "AS4+Area ID 4, AS4+Area ID 5, AS5+Area ID 5, AS6+Area ID 6" in its list of AS numbers and area IDs. In this manner, the optimal route is changed to the entry having the highest priority among the entries having the AS_PATH attribute that does not include the disaster area. Out of the entries including the destination network address "F", the entry with the registry of the open circle symbol "o" in its optimal route field has the AS_PATH attribute that does not include the area ID 3 representing the disaster area in the list of AS numbers and area IDs. There is accordingly no update for the entries including the destination network address "F".

After updating the BGP table 350a, the relay device 300a updates the routing table 360a at step S789 described above. FIG. 24 shows the contents of the routing table 360a after the update. Accompanied with the update of the BGP table 350a, "D1" corresponding to the entry having the newly registered open circle symbol "o" in its optimal route field in the updated BGP table 350a is registered as the next hop of the destination network address "G" in the updated routing table 360a as shown in FIG. 24. The next hop "D1" is the IP address assigned to the relay device 300h.

The relay route between the relay device 300a and the relay device 300n is accordingly changed from the communication path P1 going through the relay devices 300c to 300f to another communication path P2 going through the relay devices 300g to 300l, i.e., the relay route that does not go through the disaster area.

A-5. Advantageous Effects

In the network system 1000 described above, the disaster information management server 200 receives the disaster information DI from the disaster information source server 100 and sends a disaster notification packet including the area ID of the disaster area to each relay device 300x. In response to reception of the disaster notification packet from the disaster information management server 200, the relay device 300x changes the current relay route to another relay route that does not include the disaster area, based on the area ID included in the received disaster notification packet. This enables the current relay route to be promptly changed to an alternative relay route on the occurrence of a disaster without waiting for termination of the connection by the routing protocol between the relay devices on the communication path going through the disaster area. In the case where the connection by the routing protocol is not terminated, promptly changing the relay route to an alternative route bypassing the disaster area advantageously avoids network congestion in the disaster area and thereby reduces degradation of communication quality between areas other than the disaster area.

In the network system 1000, the respective relay devices 300x exchange routing information packets with each other and dynamically learn the routing information. Such dynamic learning does not require the user's manual settings for the relay device 300x to learn the routing information, thus improving the user's convenience. This also enables the relay devices 300x to flexibly learn the routing information in the communication environment.

In the network system 1000, in response to a request from each relay device 300x, the disaster information management server 200 distributes the area ID, which has been assigned to the relay device 300x as the request source, to the relay device 300x. The relay device 300x can thus automatically register the area ID assigned to itself into the device-specific table 340a. This does not require the user's manual entry to register the area ID into the relay device 300x. The user of the relay device 300x may not be even informed of the area ID assigned to the relay device 300x.

In the network system 1000, only when the estimated disaster scale included in the disaster information DI is greater than the disaster scale threshold TH, the disaster information management server 200 sends a disaster notification packet to each relay device 300x. The relay route is accordingly changed, based on the occurrence or prediction of a disaster that may affect the communication between the relay devices 300x. This prevents unnecessary change of the relay route and reduces transmission of unnecessary disaster notification packets, thus restricting an increase of the network load.

B. Second Embodiment

Figure 25:
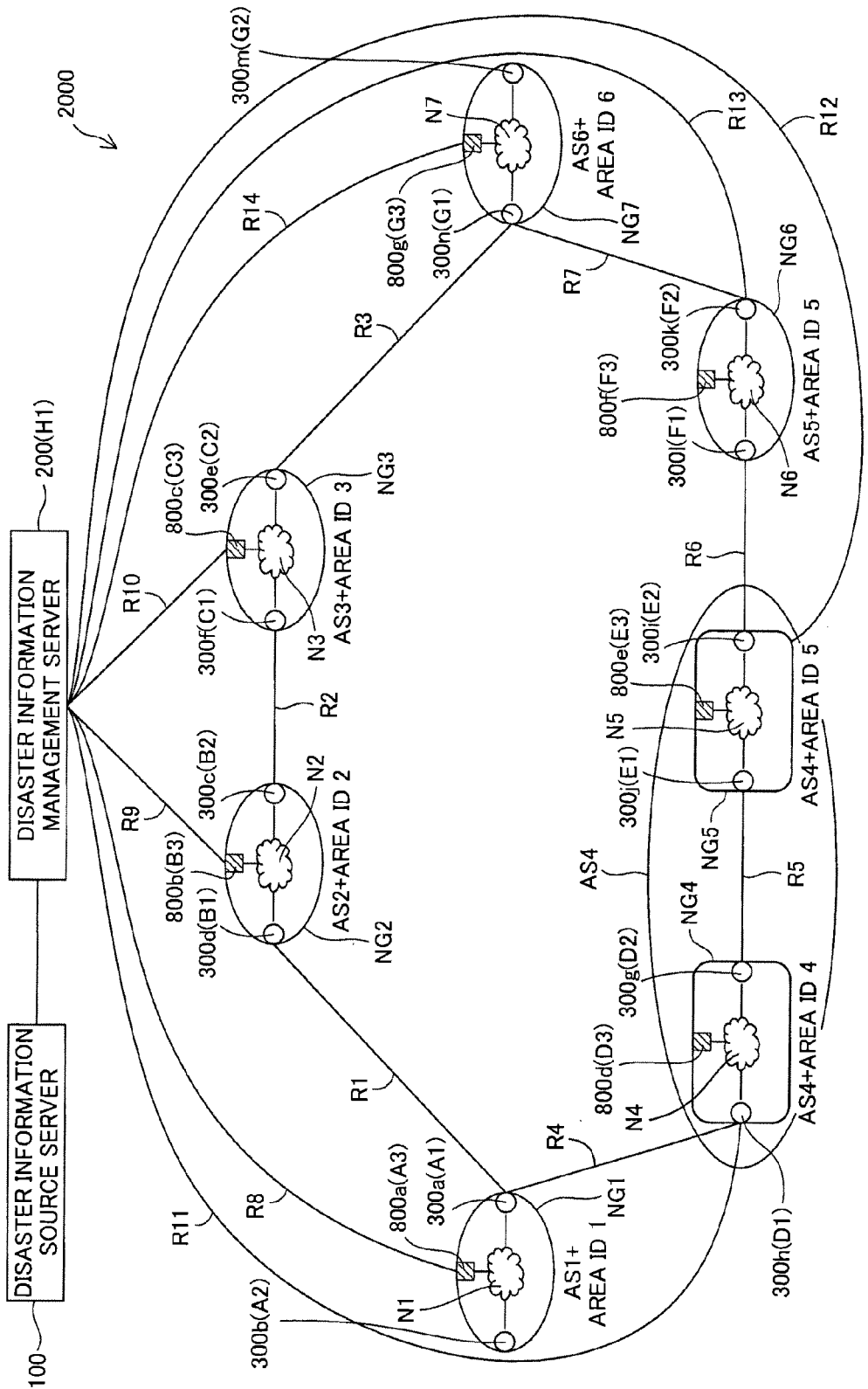
FIG. 25 illustrates the general configuration of another network system according to a second embodiment.

The following describes a second embodiment of the invention. FIG. 25 illustrates the general configuration of a network system 2000 according to the second embodiment. As illustrated, the difference of the network system 2000 from the network system 1000 of the first embodiment is that disaster information management proxy servers 800a to 800g (hereinafter the disaster information management proxy servers 800a to 800g are collectively referred to as "disaster information management proxy server 800x") are provided individually in the respective network groups NG1 to NG7. IP addresses A3 to G3 are assigned to the respective disaster information management proxy servers 800a to 800g. The following describes only the differences of the network system 2000 from the network system 1000 of the first embodiment, while the same configuration as that of the first embodiment is not specifically described here.

Figures 26, 27, 28:
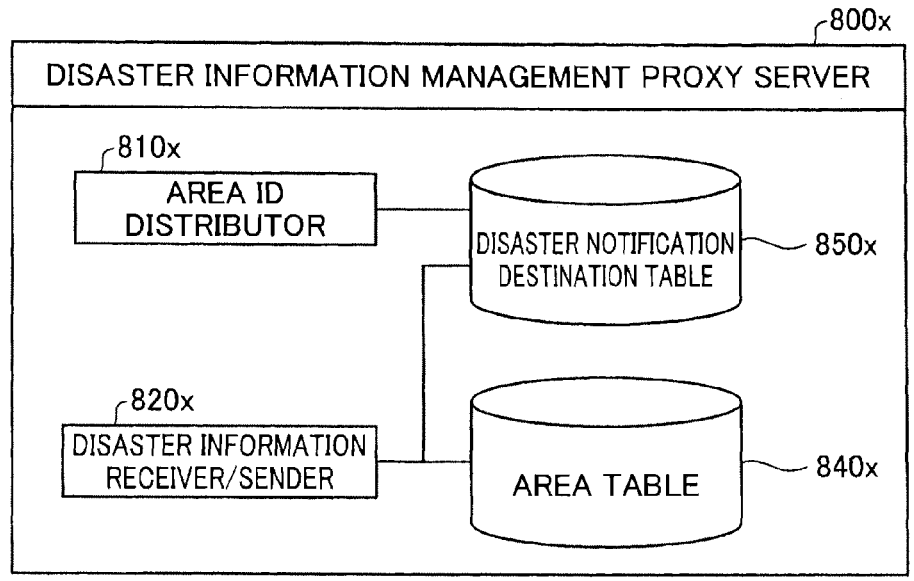
FIG. 26 illustrates the general structure of a disaster information management proxy server according to the second embodiment.
FIG. 27 shows a concrete example of a disaster notification destination table included in a disaster information management server according to the second embodiment.
FIG. 28 shows a concrete example of a disaster notification destination table included in the disaster information management proxy server according to the second embodiment.

FIG. 26 illustrates the general structure of the disaster information management proxy server 800x. As illustrated, the disaster information management proxy server 800x includes an area ID distributor 810x, a disaster information receiver/sender 820x, an area table 840x and a disaster notification destination table 850x. The area ID distributor 810x has the similar functions to those of the area ID distributor 210 of the disaster information management server 200.

The disaster information receiver/sender 820x receives a disaster notification packet from the disaster information management server 200 and sends a disaster notification packet including the area ID included in the received disaster notification packet to each relay device 300x under management of the disaster information management proxy server 800x. The disaster information management server 200 sends the disaster notification to each relay device 300x according to the first embodiment, while sending the disaster notification to each disaster information management proxy server 800x according to the second embodiment. The IP addresses of the respective disaster information management proxy servers 800x are accordingly registered as the disaster notification destination IP address in the disaster notification destination table 250 of the disaster information management server 200 as shown in FIG. 27.

The area table 840x has the same structure as the area table 240 included in the disaster information management server 200. The disaster notification destination table 850x has the registry of the IP addresses of the relay devices 300x included in the corresponding one of the network groups NG1 to NG7, which each disaster information management proxy server 800x belongs to. FIG. 28 illustrates a disaster notification destination table 850a of the disaster information management proxy server 800a. In the illustrated example, the disaster notification destination table 850a has the registry of the IP addresses "A1" and "A2" of the relay devices 300a and 300b included in the network group NG1, which the disaster information management proxy server 800a belongs to. According to this embodiment, the contents of the disaster notification destination table 850x are registered in advance by the user of the disaster information management proxy server 800x. According to another embodiment, the contents of the respective disaster notification destination tables 850x may be registered in advance in the disaster information management server 200, and each disaster information management proxy server 800x may obtain the contents of the corresponding disaster notification destination table 850x from the disaster information management server 200 by a procedure similar to the area ID acquisition process described in the first embodiment.

Figure 29:
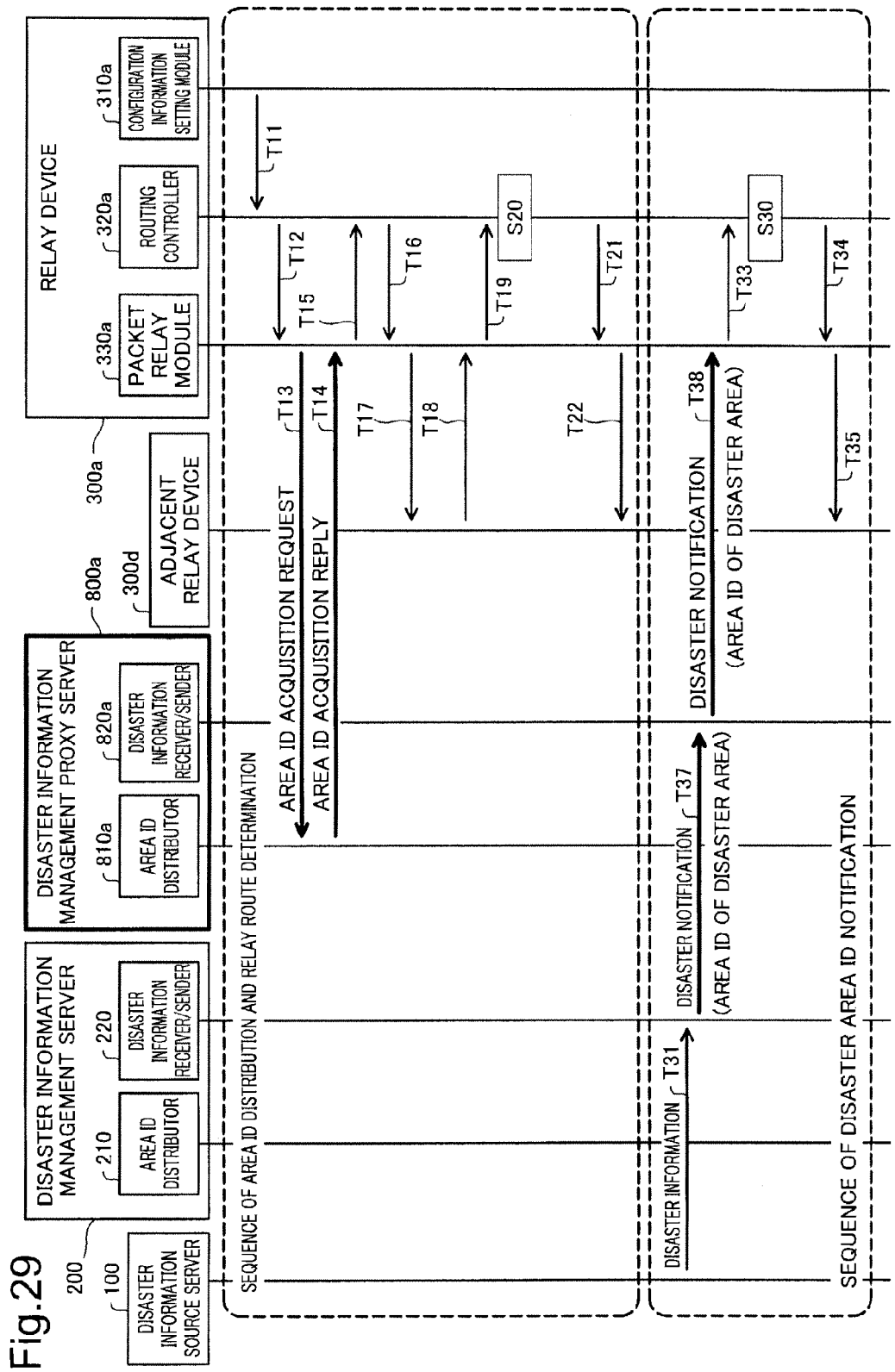
FIG. 29 shows a sequence of routing control in the network system according to the second embodiment.

The flow of routing control in the network system 2000 is shown in FIG. 29. FIG. 29 is the flow diagram corresponding to the flow diagram of the first embodiment shown in FIG. 13. The following describes only the differences from the first embodiment (FIG. 13), and the similar communications and operations to those of the first embodiment are not specifically described here. The thick lines in FIG. 29 represent the differences from those of the first embodiment.

As shown in FIG. 29, in the phase (sequence) of area ID distribution and relay route determination before the occurrence of a disaster, the relay device 300a sends an area ID acquisition request to the area ID distributor 810a of the disaster information management proxy server 800a (communication T13), in order to obtain the area ID assigned to the relay device 300a. The area ID distributor 810a of the disaster information management proxy server 800a sends back an area ID acquisition reply to the relay device 300a (communication T14), in order to distribute the area ID of the relay device 300a as the request source. The other communications and operations in the phase of area ID distribution and relay route determination are identical with those of the first embodiment.

As shown in FIG. 29, in the phase (sequence) of disaster area ID notification on the occurrence of a disaster, the disaster information receiver/sender 220 of the disaster information management server 200 receives disaster information DI (communication T31), refers to the disaster notification destination table 250 and sends a disaster notification packet to the disaster information receiver/sender 820a of the disaster information management proxy server 800a, so as to notify the disaster information management proxy server 800a of the area ID of the disaster area (communication T37). According to this embodiment, the disaster notification packet is not sent to the relay device 300x located in the disaster area, like the first embodiment. When receiving the notification of the area ID of the disaster area, the disaster information receiver/sender 820a sends a disaster notification packet to the relay device 300a, so as to notify the relay device 300a of the area ID of the disaster area (communication T38). The other communications and operations in the phase of disaster area ID notification are identical with those of the first embodiment.

The following describes a disaster notification process performed by the disaster information management proxy server 800x. The disaster notification process receives a disaster notification packet from the disaster information management server 200 and notifies the relay device 300x of the disaster area where the disaster occurs, based on the received disaster notification packet. This process corresponds to the communication T38 shown in FIG. 29. The disaster notification process is repeatedly performed during the operation of the disaster information management proxy server 800x.

Figure 30:
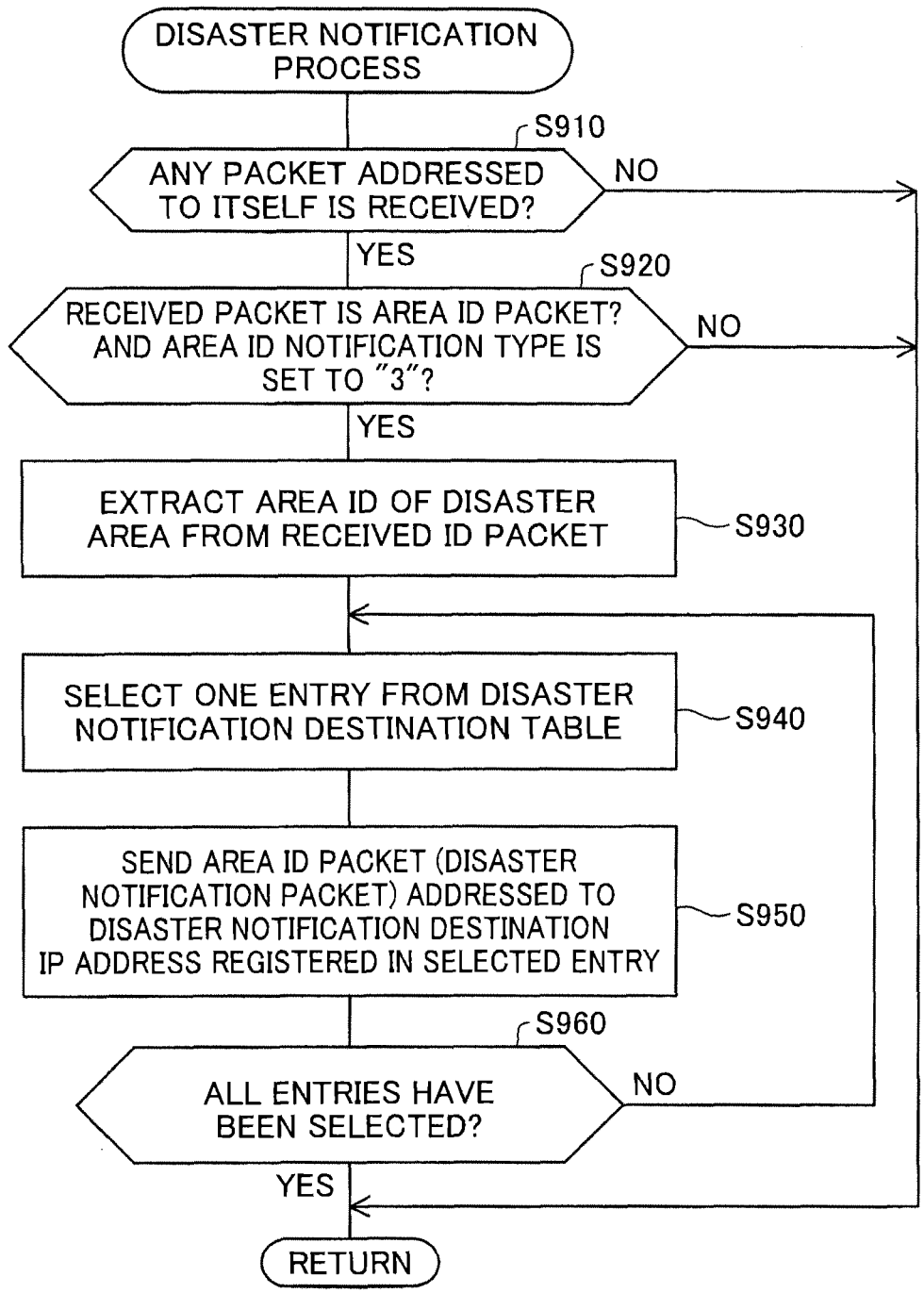
FIG. 30 is a flowchart showing a procedure of disaster notification process performed by the disaster information management proxy server according to the second embodiment.

The flow of disaster notification process is shown in FIG. 30. On the start of the disaster notification process, the disaster information receiver/sender 820x of the disaster information management proxy server 800x determines whether any packet addressed to the own disaster information management proxy server 800x or itself is received (step S910). When no packet addressed to itself is received (step S910: NO), the disaster information receiver/sender 820x goes to RETURN. When any packet addressed to itself is received (step S910: YES), on the other hand, the disaster information receiver/ sender 820x subsequently determines whether the received packet is an area ID packet and whether its area ID notification type is set to "3" (step S920). The area ID packet with the setting of "3" to the area ID notification type means that the packet is the disaster notification packet.

When the received packet is not the disaster notification packet (step S920: NO), the disaster information receiver/sender 820x goes to RETURN. When the received packet is the disaster notification packet (step S920: YES), on the other hand, the disaster information receiver/sender 820x extracts an area ID from the received disaster notification packet (step S930). This area ID represents the disaster area.

After extracting the area ID, the disaster information receiver/sender 820x selects one entry among the unselected entries in the disaster notification destination table 850x (step S940). After selecting one entry, the disaster information receiver/sender 820x sends an area ID packet addressed to the disaster notification destination IP address registered in the selected entry (step S950). In this case, the value "3" is set in the area ID notification type field of this area ID packet. The setting of "3" means that the area ID packet is the disaster notification packet. The area ID extracted at step S930 is set in the area ID field of this area ID packet.

After sending the area ID packet, the disaster information receiver/sender 820x determines whether all the entries have been selected from the disaster notification destination table 850x at step S940 (step S960). When there is any entry that has not yet selected (step S960: NO), the disaster information receiver/sender 820x returns the processing flow to step S940. When all the entries have been selected (step S960: YES), on the other hand, the disaster information receiver/sender 820x goes to RETURN.

In the network system 2000 described above, the disaster information management proxy servers 800x are individually provided in the respective network groups NG1 to NG7. When receiving a disaster notification packet from the disaster information management server 200, the disaster information management proxy server 800x sends a disaster notification packet to the relay device 300x belonging to the same network group, i.e., the relay device 300x with the same area ID. This configuration enables distributive management of the IP addresses of the relay devices 300x and thereby reduces the processing load and the IP address management load of the disaster information management server 200.

C. Modifications

The following describes modifications of the above embodiments.

C-1. Modification 1

The above embodiment describes the system configuration in which the disaster information management server 200 takes advantage of the Earthquake Early Warning provided by Japan Meteorological Agency to obtain disaster information DI. Obtaining the disaster information DI is, however, not limited to this configuration. For example, the disaster information management server 200 may take advantage of another earthquake warning provided by a private organization or company. The source of the disaster information DI is not limited to such earthquake warning. According to another embodiment, the disaster information management server 200 may monitor update of a specific site on the Internet and detect the occurrence of an earthquake when a predetermined keyword is included in the updated information. The specific site may be, for example, a Weather, Climate & Earthquake Information site provided by Japan Meteorological Agency or an RSS (RDF Site Summary) site with respect to various disasters.

In this modified application, the disaster information management server 200 may additionally include a retrieval module configured to search the obtained disaster information with a predetermined keyword and retrieve a disaster area. The predetermined keyword may be, for example, a keyword representing the area name or a keyword representing the occurrence of an earthquake. The area name may be, for example, the name of a region, the name of a prefecture, or the name of a municipality. A keyword representing the earthquake size or the earthquake intensity may be additionally used to extract the disaster scale. In the configuration of retrieving the disaster area by searching, the disaster information DI is not required to follow the special format dedicated for the disaster information management server 200. The disaster information management server 200 can thus obtain the disaster information DI from any of various information sources mentioned above. This improves the versatility of the information management server 200.

C-2. Modification 2

In the embodiment described above, the disaster information management server 200 compares the estimated disaster scale included in the disaster information DI (Earthquake Early Warning) with the disaster scale threshold TH and determines the requirement or non-requirement for a disaster notification, based on the result of the comparison. This configuration is, however, not restrictive. According to another embodiment, the disaster information management server 200 may send a disaster notification when the predicted earthquake intensity included in the Earthquake Early Warning is equal to or greater than a predetermined threshold. When the predicted earthquake intensity is equal to or greater than the predetermined threshold in the Earthquake Early Warning, the predicted earthquake intensity is provided in correlation to each area name. In this application, the disaster information management server 200 may send a disaster notification packet to notify of only the areas having the predicted earthquake intensities equal to or greater than the predetermined threshold. This enables the routing control of the higher accuracy.

C-3. Modification 3

In the embodiment described above, when receiving a disaster notification, the relay device 300x selects a route having the relatively higher priority in the BGP table 350a as an alternative route, which the current relay route is to be changed to. Determining the alternative route is, however, not limited to this selection method when there are multiple candidates for the alternative route. For example, when the area ID is structured to indicate the distance of the corresponding area from another area as the separation degree, the relatively lower priority may be given to the relay route including the area ID having the relatively small distance from the disaster area.

More specifically, one simplified procedure may assign area IDs to the respective areas in an ascending order or in a descending order from the north east to the south west, like the prefectural numbers. In this application, the absolute value of the difference between each area ID included in the AS_PATH attribute and the area ID of the disaster area approximately indicates the geographical distance between the corresponding area and the disaster area. The relay device 300x may thus determine the alternative route by the following procedure.

The relay device 300x may first calculate the absolute value of the difference between each area ID included in the AS_PATH attribute recorded as the list of AS numbers and area IDs and the area ID of the disaster area, with respect to each of the entries having the same destination network address in the BGP table 350a. The relay device 300x may subsequently select the minimum value among the calculated absolute values of the differences with respect to each entry and employs the AS_PATH attribute of the entry having the largest minimum value, as the alternative route. This application compares the relay areas of the respective entries closest to the disaster area and sets the lower priority to the relay route in the entry having the closest relay area nearer to the disaster area. This prevents the relay route going through the relay area nearer to the disaster area from being employed as the alternative route, thus improving the reliability of the alternative route.

According to another embodiment, the area ID may be defined by coordinate information of the latitude and the longitude. Such coordinate information enhances the calculation accuracy of the distance of each area from the disaster area, thus further improving the reliability of the alternative route.

The distance of each area from the disaster area may be determined as a whole relay route. For example, the relay device 300x may calculate the absolute value of the difference between each area ID included in the AS_PATH attribute recorded as the list of AS numbers and area IDs and the area ID of the disaster area, with respect to each of the entries having the same destination network address in the BGP table 350a. The relay device 300x may subsequently calculate an evaluation value E by normalizing the summation of the calculated absolute values of the differences with respect to each entry by using the number of hops. The evaluation value E may be expressed by Equation (1) given below. The evaluation value E may be obtained by weighting the absolute values of the respective differences with a preset weighting coefficient. In Equation (1), "n" represents the number of hops, IDi represents each area ID included in the AS_PATH attribute, IDD represents the area ID of the disaster area and Ki represents a weighting coefficient.

$$E = \frac{\sum_{i=1}^{n} \left( Ki \cdot \sqrt{(IDi - IDD)^2} \right)}{n} \quad (1)$$

The AS_PATH attribute of the entry having the largest evaluation value E may be employed as the alternative route. The relay route wholly distant from the disaster area is thus preferentially selected as the alternative route. This further improves the reliability of the alternative route. The weighting coefficient Ki may be varied according to the difference between IDi and IDD. More specifically, the weighting coefficient Ki may be decreased for the greater difference between IDi and IDD and increased for the smaller difference between IDi and IDD. This advantageously prevents the area sufficiently distant from the disaster area from affecting the evaluation.

C-4. Modification 4

In the embodiment described above, the relay device 300x uses the existing BGP protocol to learn the routing information. The routing information learnt by the relay device 300x is accordingly given as the AS_PATH attribute including the combination of AS numbers and area IDs. Learning the routing information including the AS numbers is, however, not essential. For example, in a modified application that does not use the BGP protocol but creates a new protocol to learn the routing information, the routing information is required to include area information that allows discrimination of packet relay areas and a network address of the relay device 300x.

C-5. Modification 5

In the embodiment described above, the relay devices 300x exchange routing information packets with each other, so as to learn the routing information. Learning the routing information is, however, not limited to this configuration. According to another embodiment, the disaster information management server 200 may collectively manage routing information, and each relay device 300x may receive the routing information from the disaster information management server 200 to learn the routing information. According to yet another embodiment, the relay device 300x may receive the user's entry of routing information to learn the routing information.

C-6. Modification 6

In the embodiment described above, the disaster information DI is information on the earthquake. The disaster information DI is, however, not limited to the information on the earthquake but may be information on the occurrence or prediction of any of various disasters. The term "disaster" herein means any meteorological or other natural phenomenon or manmade phenomenon that may be fatal to humans and adversely affect the society. Examples of such phenomena include fire disaster, flood disaster, volcanic eruption, tornado, terrorism and war.

The foregoing has described the invention in detail with reference to the illustrative embodiments and modifications. Among the various elements of the above embodiments and modifications, the elements other than those disclosed in the independent claims are additional and supplementary elements and may be omitted or may be combined according to the requirements. The invention is not limited to the above embodiments or modifications, but a multiplicity of other variants and modifications may be made to the embodiments without departing from the scope of the invention. The invention is not limited to the relay device or the network system but may also be implemented by, for example, a server provided in the network system, programs implemented on the server and the relay device, storage media in which such programs are recorded, and a routing control method of the relay device.

What is claimed is:

1. A relay device configured to relay communication packets, comprising: a processor coupled to a memory storing a predetermined program, configured to execute the predetermined program to implement a routing controller and a relay module; the routing controller configured to perform learning of routing information, which includes area information used to identify a relay area of the communication packets and a network address of one or more other relay devices, and to determine a relay route of the communication packets based on the learnt routing information; and the relay module configured to send the communication packets received by the relay device to a destination address of the received communication packets based on a determined relay route, wherein when the relay device receives a disaster notification packet notifying of a disaster area and when the determined relay route includes the disaster area, the routing controller changes the relay route to an alternative relay route that does not include the disaster area;

the area information is structured to indicate a separation between relay areas; and when there are a plurality of candidate alternative routes which do not include the disaster area, the routing controller is configured to set, among the plurality of candidate alternative routes, a lower priority to a candidate alternative route including a relay area having a smaller separation from the disaster area and a higher priority to a candidate alternative route including a relay area having a higher separation from the disaster area, and determine the candidate alternative route, to which the determined relay route is to be changed, according to the priority.

2. The relay device according to claim 1, further comprising:
a storage module configured to store a location area of the relay device,
wherein, when the relay device receives, from a first relay device of the other relay devices, a routing information packet that is structured to allow the learning of the routing information and includes a location area and a network address of the first relay device, the routing controller is configured to perform the learning of the routing information based on the received routing information packet, and the routing controller is configured to add a location area and a network address of the relay device to the received routing information packet so as to generate a new routing information packet, and
the relay module is configured to send the new routing information packet to a second relay device of the other relay devices, which is different from the first relay device.

3. The relay device according to claim 2, further comprising: the processor further configured to execute the predetermined program to implement a location area setting module; and the location area setting module configured to record into the storage module a location area of the relay device, which is included in a reply packet received by the relay device as a response to a request to a server that registers the location area of the relay device.

4. The relay device according to claim 1, wherein
the routing controller is configured to determine the relay route by giving preference to a candidate alternative route having a fewer number of hops included in the learnt routing information than other candidate alternative routes.

5. A network system including a server and a plurality of relay devices, wherein at least one relay device is provided in each area specified by area division and each of the relay devices is configured to relay communication packets, the server comprising: a first processor coupled to a first memory storing a first predetermined program, configured to execute the first predetermined program to implement an acquisition module and a disaster notification module; the acquisition module configured to obtain disaster information representing occurrence of a disaster or prediction for occurrence of a disaster in a specific area; and the disaster notification module configured to send a disaster notification packet including information representing a disaster area which is the specific area, based on the obtained disaster information, and to provide notification of the disaster area to a relay device other than a relay device located in the disaster area among the plurality of relay devices, each of the plurality of relay devices comprising: a second processor coupled to a second memory storing a second predetermined program, configured to execute the second predetermined program to implement a routing controller and a relay module; the routing controller configured to perform learning of routing information, which includes area information used to identify a relay area of the communication packets specified based on the area division and a network address of one or more other relay devices, and to determine a relay route of the communication packets based on the routing information; and the relay module configured to send the communication packets received by the relay device to a destination address of the received communication packets based on the determined relay route,
wherein when the relay device receives the disaster notification packet and when the determined relay route includes the disaster area, the routing controller is configured to change the relay route to an alternative relay route that does not include the disaster area.

6. A network system including a first server, a plurality of second servers wherein at least one second server is provided in each area specified by area division, and a plurality of relay devices, each being configured to relay communication packets, the first server comprising: a first processor coupled to a first memory storing a first predetermined program, configured to execute the first predetermined program to implement an acquisition module and a first disaster notification module; the acquisition module configured to obtain disaster information representing occurrence of a disaster or prediction for occurrence of a disaster in a specific area; and the first disaster notification module configured to send a first disaster notification packet including information representing a disaster area which is the specific area, based on the obtained disaster information, and to provide notification of the disaster area to a second server other than a second server located in the disaster area among the plurality of second servers, each of the plurality of second servers comprising: a second processor coupled to a second memory storing a second predetermined program, configured to execute the second predetermined program to implement a second disaster notification module; a receiver configured to receive the first disaster notification packet; and the second disaster notification module configured to send a second disaster notification packet including the information representing the disaster area, which is included in the first disaster notification packet, and to provide notification of the disaster area to a relay device other than a relay device located in the disaster area among the plurality of relay devices, each of the plurality of relay devices comprising: a third processor coupled to a third memory storing a third predetermined program, configured to execute the third predetermined program to implement a routing controller and a relay module; the routing controller configured to perform learning of routing information, which includes area information used to identify a relay area of the communication packets specified based on the area division and a network address of one or more other relay devices, and to determine a relay route of the communication packets, based on the routing information; and the relay module configured to send the communication packets received by the relay device to a destination address of the received communication packets, based on the determined relay route,
wherein when the relay device receives the second disaster notification packet and when the determined relay route includes the disaster area, the routing controller is configured to change the relay route to an alternative relay route that does not include the disaster area.

7. A computer program product giving notification to a plurality of relay devices, each being configured to relay communication packets, the computer program product comprising:
a non-transitory computer readable storage medium; and
a computer program code stored in the non-transitory computer readable storage,
the computer program code comprising:
a program code for an acquisition function of obtaining disaster information representing occurrence of a disaster or prediction for occurrence of a disaster in a specific area;
a program code for a disaster notification function of sending a disaster notification packet including information representing a disaster area, which is the specific area, based on the obtained disaster information and notifying at least a relay device other than a relay device located in the disaster area among the plurality of relay devices, of the disaster area; and a program code for a retrieval function of searching the obtained disaster information with a predetermined keyword to retrieve the disaster area, wherein the disaster notification function sends the disaster notification packet including information representing the retrieved disaster area.

8. The computer program product according to claim 7, wherein the disaster information includes a disaster scale, and the disaster notification function notifies of the disaster area only when the disaster scale is equal to or greater than a predetermined threshold.

9. The computer program product according to claim 7, the computer program code further comprising:

a program code for a storage function of respectively storing location areas of the plurality of relay devices; and a program code for a location area notification function of notifying each relay device of the location area of the relay device, in response to a request from the relay device.

\* \* \* \* \*